US012688684B2

(12) United States Patent
Yu et al.

(10) Patent No.: US 12,688,684 B2
(45) Date of Patent: Jul. 21, 2026

(54) TRAINING AND USING A MODEL FOR CONTENT MODERATION OF MULTIMODAL MEDIA

(71) Applicant: Microsoft Technology Licensing, LLC, Redmond, WA (US)

(72) Inventors: Ye Yu, Redmond, WA (US); Gaurav Mittal, Redmond, WA (US); Matthew Brigham Hall, Kenmore, WA (US); Sandra Sajeev, Seattle, WA (US); Mei Chen, Bellevue, WA (US); Jialin Yuan, Corvallis, OR (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 726 days.

(21) Appl. No.: 18/175,839

(22) Filed: Feb. 28, 2023

(65) Prior Publication Data

US 2024/0290081 A1 Aug. 29, 2024

(51) Int. Cl.
*G06V 10/80* (2022.01)
*G06F 40/284* (2020.01)
*G06V 10/75* (2022.01)

(52) U.S. Cl.
CPC .......... *G06V 10/811* (2022.01); *G06F 40/284* (2020.01); *G06V 10/75* (2022.01)

(58) Field of Classification Search
None
See application file for complete search history.

(56) References Cited

U.S. PATENT DOCUMENTS 11,301,732 B2 * 4/2022 Hu ......................... G06F 18/25
2019/0325342 A1 10/2019 Sikka et al.

(Continued)

FOREIGN PATENT DOCUMENTS

AU 2022203405 A1 12/2022
CN 112069484 A 12/2020

(Continued)

OTHER PUBLICATIONS

"Amazon Rekognition Content Moderation", Retrieved From: https://aws.amazon.com/rekognition/content-moderation/, Nov. 11, 2022, 8 Pages.
"Detect Artificial Texts and Watermarks in Images and Videos", Retrieved From: https://sightengine.com/detect-artificial-text-watermarks, Aug. 17, 2022, 7 Pages.

(Continued)

*Primary Examiner* — Tahmina N Ansari
(74) *Attorney, Agent, or Firm* — Foley IP Law, PLLC

(57) ABSTRACT

A computerized method trains and uses a multimodal fusion transformer (MFT) model for content moderation. Language modality data and vision modality data associated with a multimodal media source is received. Language embeddings are generated from the language modality data and vision embeddings are generated from the vision modality data. Both kinds of embeddings are generated using operations and/or processes that are specific to the associated modalities. The language embeddings and vision embeddings are combined into combined embeddings and the MFT model is used with those combined embeddings to generate a language semantic output token, a vision semantic output token, and a combined semantic output token. Contrastive loss data is generated using the three semantic output tokens and the MFT model is adjusted using that contrastive loss data. After the MFT model is trained sufficiently, it is configured to perform content moderation operations using semantic output tokens.

17 Claims, 7 Drawing Sheets

(56)                References Cited

U.S. PATENT DOCUMENTS

| 2021/0303939 | A1* | 9/2021 | Hu | G06F 18/256 |
|---|---|---|---|---|
| 2022/0284321 | A1 | 9/2022 | Yuan et al. | |
| 2022/0300764 | A1 | 9/2022 | Liu et al. | |
| 2022/0391755 | A1* | 12/2022 | Li | G06V 30/153 |
| 2022/0392637 | A1 | 12/2022 | Kollada et al. | |
| 2024/0290081 | A1* | 8/2024 | Yu | G06F 40/284 |
| 2024/0378859 | A1* | 11/2024 | He | G06V 10/774 |

FOREIGN PATENT DOCUMENTS

| CN | 113656539 A | 11/2021 |
|---|---|---|
| WO | 2022261570 A1 | 12/2022 |

OTHER PUBLICATIONS

"Jigsaw Unintended Bias in Toxicity Classification", Retrieved From: https://www.kaggle.com/competitions/jigsaw-unintended-bias-in-toxicity-classification/overview, Jul. 19, 2019, 1 Page.

"MEMEmoderator", Retrieved From: https://moderation.fun.co/, Sep. 6, 2022, 5 Pages.

"Video Moderation Solutions to Protect Your Brand", Retrieved From: https://www.webpurify.com/video-moderation/, Dec. 4, 2022, 8 Pages.

Akyon, et al., "Deep Architectures for Content Moderation and Movie Content Rating", In Repository of arXiv:2212.04533v2, Dec. 12, 2022, 9 Pages.

Alayrac, et al., "Flamingo: A Visual Language Model for Few-Shot Learning", In Repository of arXiv:2204.14198v2, Nov. 15, 2022, 54 Pages.

Baly, et al., "Integrating Stance Detection and Fact Checking in a Unified Corpus.", In Proceedings of the Conference of the North American Chapter of the Association for Computational Linguistics: Human Language Technologies, vol. 2, Jun. 1, 2018, pp. 21-27.

Banko, et al., "A Unified Taxonomy of Harmful Content", In Proceedings of the Fourth Workshop on Online Abuse and Harms, pages, Nov. 20, 2020, pp. 125-137.

Brown, et al., "Language Models are Few-Shot Learners", In Proceedings of 34th Conference on Neural Information Processing Systems, Dec. 6, 2020, 25 Pages.

Caselli, et al., "HateBERT: Retraining BERT for Abusive Language Detection in English", In Repository of arXiv:2010.12472v1, Oct. 23, 2020, 8 Pages.

Changpinyo, et al., "Conceptual 12M: Pushing Web-Scale Image-Text Pre-Training to Recognize Long-Tail Visual Concepts", In Proceedings of the IEEE/CVF Conference on Computer Vision and Pattern Recognition, Jun. 20, 2021, pp. 3558-3568.

Chen, et al., "UNITER: UNiversal Image-TExt Representation Learning", In Proceedings of European conference on computer vision, Sep. 24, 2020, pp. 104-120.

Das, et al., "Detecting hate speech in multi-modal memes", In Repository arXiv:2012.14891v1, Dec. 29, 2020, 10 Pages.

Davidson, et al., "Automated Hate Speech Detection and the Problem of Offensive Language", In Proceedings of the International AAAI Conference on Web and Social Media, vol. 11, No. 1, May 3, 2017, pp. 512-515.

Ding, et al., "Davit: Dual Attention Vision Transformers", In Repository of arXiv:2204.03645v1, Apr. 7, 2022, 23 Pages.

Elsherief, et al., "Latent Hatred: A Benchmark for Understanding Implicit Hate Speech", In Repository of arXiv:2109.05322v1, Sep. 11, 2021, 19 Pages.

Gan, et al., "Large-Scale Adversarial Training for Vision-and-Language Representation Learning", In Proceedings of 34th Conference on Neural Information Processing Systems, Jun. 11, 2020, 13 Pages.

Ging, et al., "COOT: Cooperative Hierarchical Transformer for Video-Text Representation Learning", In Repository of arXiv:2011.00597v1, Nov. 1, 2020, 27 Pages.

Gomez, et al., "Exploring Hate Speech Detection in Multimodal Publications", In Proceedings of the IEEE/CVF Winter Conference on Applications of Computer Vision, Mar. 1, 2020, pp. 1470-1478.

Hartvigsen, et al., "ToxiGen: A Large-Scale Machine-Generated Dataset for Adversarial and Implicit Hate Speech Detection", In Repository of arXiv:2203.09509v1, Mar. 17, 2022, 18 Pages.

Hudson, et al., "GQA: A New Dataset for Real-World Visual Reasoning and Compositional Question Answering", In Proceedings of the IEEE/CVF Conference on Computer Vision and Pattern Recognition, Jun. 15, 2019, pp. 6700-6709.

Khattar, et al., "MVAE: Multimodal Variational Autoencoder for Fake News Detection", In Proceedings of The World Wide Web Conference, May 13, 2019, 8 Pages.

Kiela, et al., "The Hateful Memes Challenge: Detecting Hate Speech in Multimodal Memes", In Proceedings of 34th Conference on Neural Information Processing Systems, Dec. 6, 2020, 14 Pages.

Kim, et al., "Why Is It Hate Speech? Masked Rationale Prediction for Explainable Hate Speech Detection", In Repository of arXiv:2211.00243v1, Nov. 1, 2022, 12 Pages.

Kirchknopf, et al., "Multimodal Detection of Information Disorder from Social Media", In Proceedings of International Conference on Content-Based Multimedia Indexing, Jun. 28, 2021, 4 Pages.

Kuznetsova, et al., "The Open Images Dataset V4", In International Journal of Computer Vision, vol. 128, No. 7, Mar. 13, 2020, pp. 1956-1981.

Lee, et al., "Disentangling Hate in Online Memes", In Proceedings of the 29th ACM International Conference on Multimedia, Oct. 20, 2021, 10 Pages.

Li, et al., "Entity-Oriented Multi-Modal Alignment and Fusion Network for Fake News Detection", In Proceedings of IEEE Transactions on Multimedia, vol. 24, Jul. 26, 2021, pp. 3455-3468.

Li, et al., "OSCAR: Object-Semantics Aligned Pre-training for Vision-Language Tasks", In Proceedings of European Conference on Computer Vision, Sep. 24, 2020, pp. 121-137.

Lin, et al., "Microsoft COCO: Common Objects in Context", In Proceedings of European conference on computer vision, Sep. 6, 2014, pp. 740-755.

Ma, et al., "Are Multimodal Transformers Robust to Missing Modality?", In Proceedings of the IEEE/CVF Conference on Computer Vision and Pattern Recognition, Jun. 18, 2022, pp. 18177-18186.

Mathew, et al., "Hatexplain: A Benchmark Dataset for Explainable Hate Speech Detection", In Proceedings of the AAAI Conference on Artificial Intelligence, vol. 35, No. 17, May 18, 2021, pp. 14867-14875.

Modarressi, et al., "AdapLeR: Speeding up Inference by Adaptive Length Reduction", In Repository of arXiv:2203.08991v1, Mar. 16, 2022, 15 Pages.

Nakamura, et al., "r/Fakeddit: A New Multimodal Benchmark Dataset for Fine-grained Fake News Detection", In Repository of arXiv: 1911.03854v1, Nov. 10, 2019, 6 Pages.

Ordonez, et al., "Im2Text: Describing Images Using 1 Million Captioned Photographs", In Proceedings of Advances in Neural Information Processing Systems, Dec. 12, 2011, 9 Pages.

Pham, et al., "Combined Scaling for Open-Vocabulary Image Classification", In Repository of arXiv:2111.10050v2, Apr. 29, 2022, 47 Pages.

Phan, et al., "LSPD: A Large-Scale Pornographic Dataset for Detection and Classification", In International Journal of Intelligent Engineering and Systems, vol. 15, No. 1, Oct. 2021, pp. 198-213.

Qu, et al., "On the Evolution of (Hateful) Memes by Means of Multimodal Contrastive Learning", In Repository of arXiv:2212.06573v1, Dec. 13, 2022, 19 Pages.

Radford, "Learning Transferable Visual Models From Natural Language Supervision", In Proceedings of International Conference on Machine Learning, Jul. 1, 2021, 16 Pages.

Ramesh, et al., "Hierarchical Text-Conditional Image Generation with CLIP Latents", In Repository of arXiv:2204.06125v1, Apr. 13, 2022, 27 Pages.

Ren, et al., "Faster R-CNN: Towards Real-Time Object Detection with Region Proposal Networks", In Proceedings of Advances in neural information processing systems, Dec. 7, 2015, 9 Pages.

Robinson, Sara, "Filtering inappropriate content with the Cloud Vision API", Retrieved From: https://cloud.google.com/blog/products/ai-machine-learning/filtering-inappropriate-content-with-the-cloud-vision-api, Aug. 18, 2016, 9 Pages.

(56) References Cited

OTHER PUBLICATIONS

Sahoo, et al., "Detecting Unintended Social Bias in Toxic Language Datasets", In Repository of arXiv:2210.11762v1, Oct. 21, 2022, 12 Pages.

Schmidt, et al., "A Survey on Hate Speech Detection using Natural Language Processing", In Proceedings of the Fifth International Workshop on Natural Language Processing for Social Media, Apr. 3, 2017, pp. 1-10.

Sharma, et al., "Conceptual Captions: A Cleaned, Hypernymed, Image Alt-text Dataset For Automatic Image Captioning", In Proceedings of the 56th Annual Meeting of the Association for Computational Linguistics., Jul. 15, 2018, pp. 2556-2565.

Soldner, et al., "Box of Lies: Multimodal Deception Detection in Dialogues", In Proceedings of the 2019 Conference of the North American Chapter of the Association for Computational Linguistics: Human Language Technologies, vol. 1, Jun. 2, 2019, pp. 1768-1777.

Su, et al., "VL-BERT: Pre-training of Generic Visual-Linguistic Representations", In Repository of arXiv:1908.08530v1, Aug. 22, 2019, 13 Pages.

Subramaniam, et al., "Exploring Hate Speech Detection with HateXplain and BERT", In Repository of arXiv:2208.04489v1, Aug. 9, 2022, 9 Pages.

Thakur, et al., "Multimodal and Explainable Internet Meme Classification", In Repository of arXiv:2212.05612v1, Dec. 11, 2022, 9 Pages.

International Search Report and Written Opinion received for PCT Application No. PCT/US2024/016431, Jun. 13, 2024, 15 pages.

Khan, et al., "Single-Stream Multi-Level Alignment for Vision-Language Pretraining," European Conference on Computer Vision. Cham: Springer Nature Switzerland, Mar. 27, 2022, pp. 735-751.

Li, et al., "Align before Fuse: Vision and Language Representation Learning with Momentum Distillation," Advances in neural information processing systems, Jul. 16, 2021, pp. 9694-9705.

Li, et al., "MVPTR: Multi-Level Semantic Alignment for Vision-Language Pre-Training via Multi-Stage Learning," Proceedings of the 30th ACM International Conference on Multimedia, Sep. 14, 2022, pp. 4395-4405.

Singh, et al., "FLAVA: A Foundational Language And Vision Alignment Model," Proceedings of the IEEE/CVF Conference on Computer Vision and Pattern Recognition, Dec. 8, 2021, pp. 15638-15650.

Wang, et al., "Cross-modal Contrastive Learning for Multimodal Fake News Detection," Proceedings of the 31st ACM International Conference on Multimedia, Feb. 25, 2023, pp. 5696-5704.

Wang, et al., "UFO: A UniFied Transformer for Vision-Language Representation Learning," arXiv preprint, Nov. 19, 2021, 14 Pages.

International Preliminary Report on Patentability (Chapter I) received for PCT Application No. PCT/US2024/016431, Sep. 11, 2025, 10 pages.

Vaswani, et al., "Attention is All you Need", In Proceedings of Advances in Neural Information Processing Systems 30, Dec. 4, 2017, 11 Pages.

Vosoughi, et al., "The Spread of True and False News Online", In Journal of Science vol. 359, Mar. 9, 2018, 6 Pages.

Wang, et al., "OFA: Unifying Architectures, Tasks, and Modalities Through a Simple Sequence-to-Sequence Learning Framework", In Proceedings of 39th International Conference on Machine Learning, Jul. 17, 2022, 23 Pages.

Wang, et al., "SimVLM: Simple Visual Language Model Pretraining with Weak Supervision", In Repository of arXiv:2108.10904v1, Aug. 24, 2021, 16 Pages.

Waseem, et al., "Hateful Symbols or Hateful People? Predictive Features for Hate Speech Detection on Twitter", In Proceedings of the NAACL Student Research Workshop, Jun. 12, 2016, pp. 88-93.

Waseem, et al., "Understanding Abuse: A Typology of Abusive Language Detection Subtasks", In Proceedings of the First Workshop on Abusive Language Online, Jul. 30, 2017, pp. 78-84.

Yang, et al., "Unified Contrastive Learning in Image-Text-Label Space", In Proceedings of the IEEE/CVF Conference on Computer Vision and Pattern Recognition, Jun. 18, 2022, pp. 19163-19173.

Young, et al., "From Image Descriptions to Visual Denotations: New Similarity Metrics for Semantic Inference Over Event Descriptions", In Journal of Transactions of the Association for Computational Linguistics, vol. 2, Feb. 1, 2014, pp. 67-78.

Yu, "Ernie-Vil: Knowledge Enhanced Vision-Language Representations through Scene Graphs", In Proceedings of he AAAI Conference on Artificial Intelligence, Jun. 18, 2021, pp. 3208-3216.

Yuan, et al., "Florence: A New Foundation Model for Computer Vision", In Repository of arXiv:2111.11432v1, Nov. 22, 2021, 17 Pages.

Zaheri, et al., "Toxic Comment Classification", In Journal of SMU Data Science Review, vol. 3, No. 1, Jul. 9, 2020, 17 Pages.

Zhang, et al., "VinVL: Revisiting Visual Representations in Vision-Language Models", In Proceedings of the IEEE/CVF Conference on Computer Vision and Pattern Recognition, Jun. 20, 2021, pp. 5579-5588.

Zhou, et al., "Challenges in Automated Debiasing for Toxic Language Detection", In Proceedings of the 16th Conference of the European Chapter of the Association for Computational Linguistics, Apr. 19, 2021, pp. 3143-3155.

Zhu, Ron, "Enhance Multimodal Transformer With External Label and In-Domain Pretrain: Hateful Meme Challenge Winning Solution", In Repository of arXiv:2012.08290v1, Dec. 15, 2020, 10 Pages.

Zolfaghari, et al., "CrossCLR: Cross-modal Contrastive Learning for Multi-modal Video Representations", In Repository of arXiv:2109.14910v1, Sep. 30, 2021, 14 Pages.

* cited by examiner

400

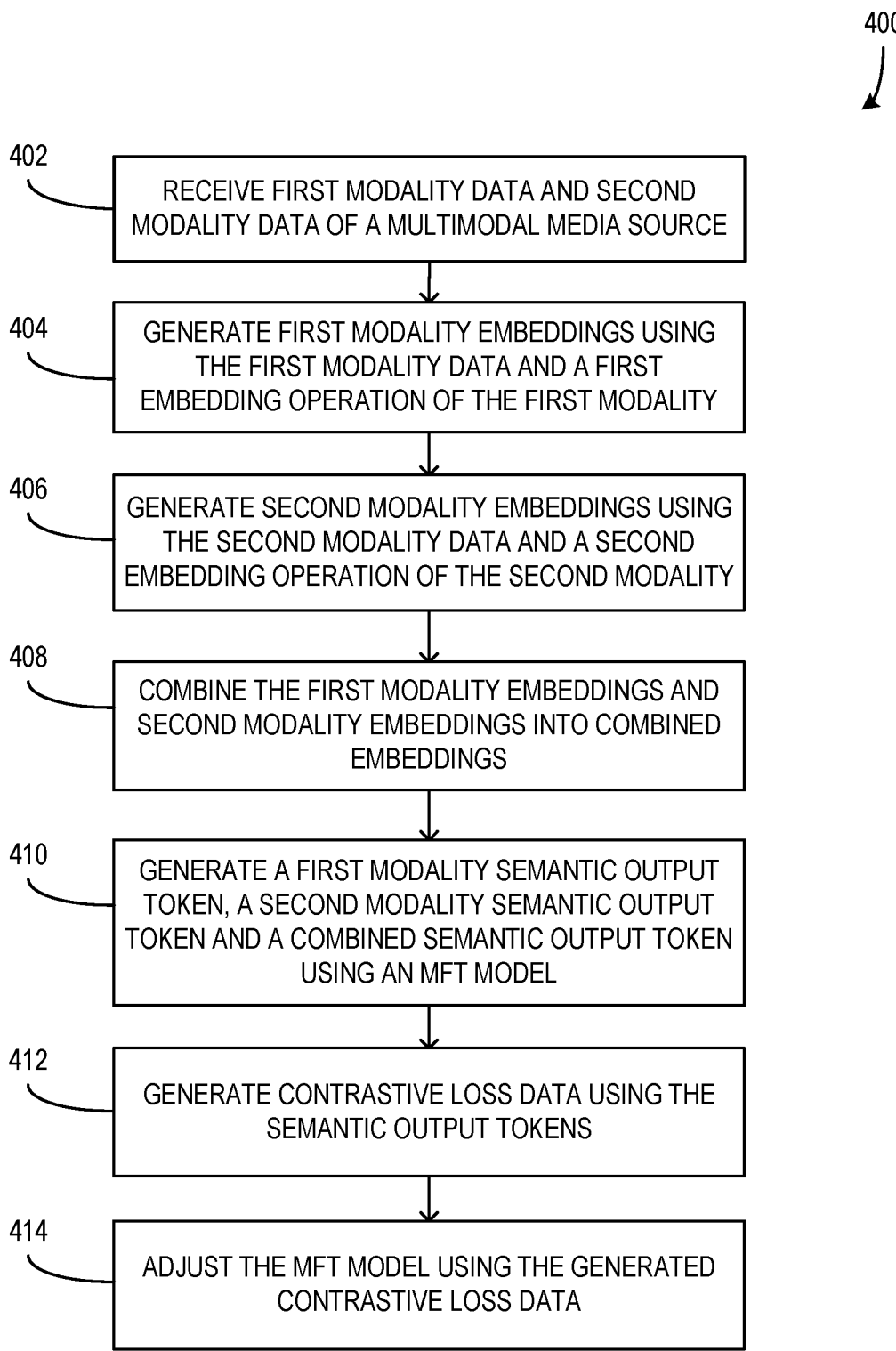

402   RECEIVE FIRST MODALITY DATA AND SECOND MODALITY DATA OF A MULTIMODAL MEDIA SOURCE

404   GENERATE FIRST MODALITY EMBEDDINGS USING THE FIRST MODALITY DATA AND A FIRST EMBEDDING OPERATION OF THE FIRST MODALITY

406   GENERATE SECOND MODALITY EMBEDDINGS USING THE SECOND MODALITY DATA AND A SECOND EMBEDDING OPERATION OF THE SECOND MODALITY

408   COMBINE THE FIRST MODALITY EMBEDDINGS AND SECOND MODALITY EMBEDDINGS INTO COMBINED EMBEDDINGS

410   GENERATE A FIRST MODALITY SEMANTIC OUTPUT TOKEN, A SECOND MODALITY SEMANTIC OUTPUT TOKEN AND A COMBINED SEMANTIC OUTPUT TOKEN USING AN MFT MODEL

412   GENERATE CONTRASTIVE LOSS DATA USING THE SEMANTIC OUTPUT TOKENS

414   ADJUST THE MFT MODEL USING THE GENERATED CONTRASTIVE LOSS DATA

FIG. 4

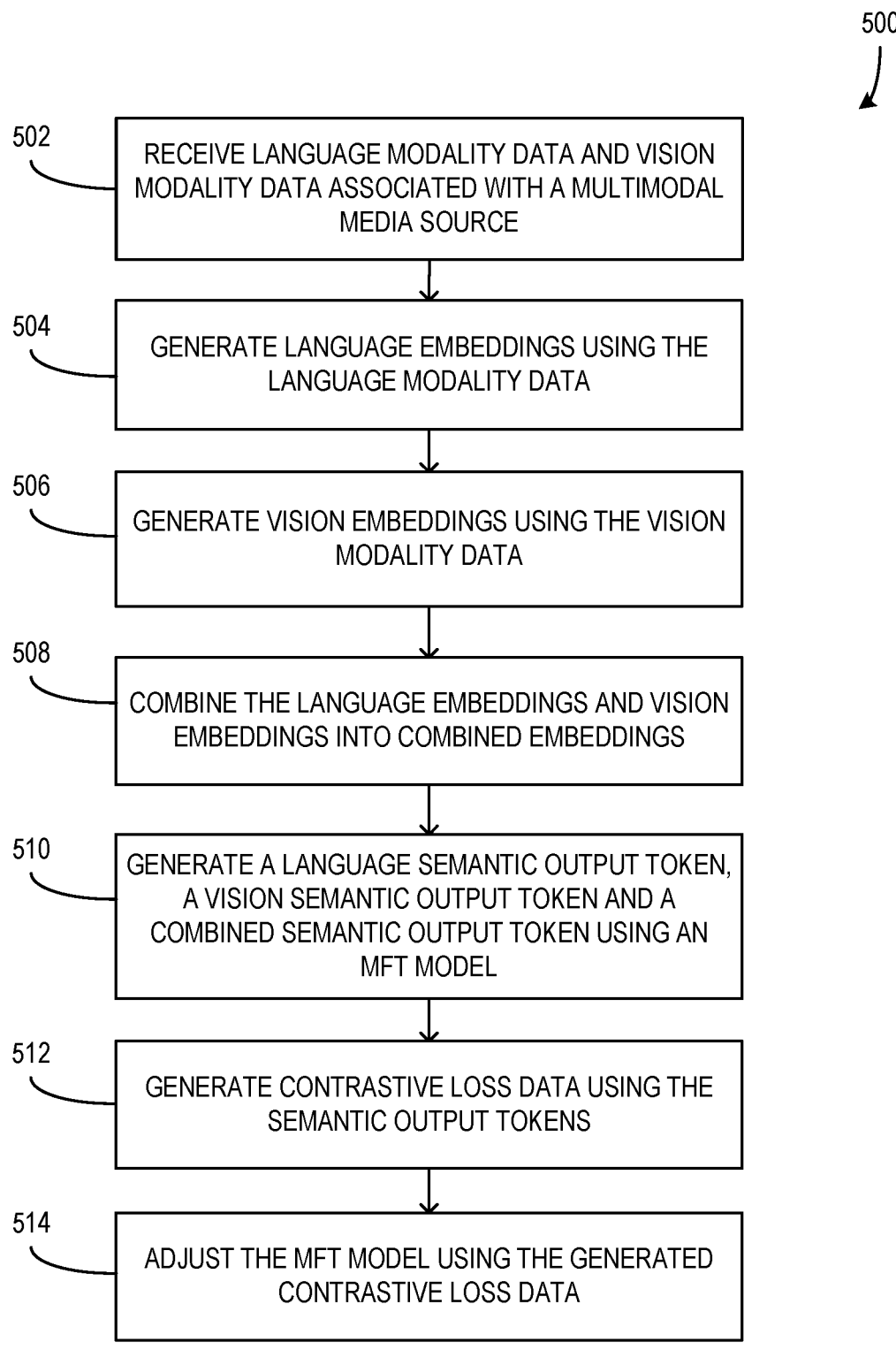

500

502   RECEIVE LANGUAGE MODALITY DATA AND VISION MODALITY DATA ASSOCIATED WITH A MULTIMODAL MEDIA SOURCE

504   GENERATE LANGUAGE EMBEDDINGS USING THE LANGUAGE MODALITY DATA

506   GENERATE VISION EMBEDDINGS USING THE VISION MODALITY DATA

508   COMBINE THE LANGUAGE EMBEDDINGS AND VISION EMBEDDINGS INTO COMBINED EMBEDDINGS

510   GENERATE A LANGUAGE SEMANTIC OUTPUT TOKEN, A VISION SEMANTIC OUTPUT TOKEN AND A COMBINED SEMANTIC OUTPUT TOKEN USING AN MFT MODEL

512   GENERATE CONTRASTIVE LOSS DATA USING THE SEMANTIC OUTPUT TOKENS

514   ADJUST THE MFT MODEL USING THE GENERATED CONTRASTIVE LOSS DATA

FIG. 5

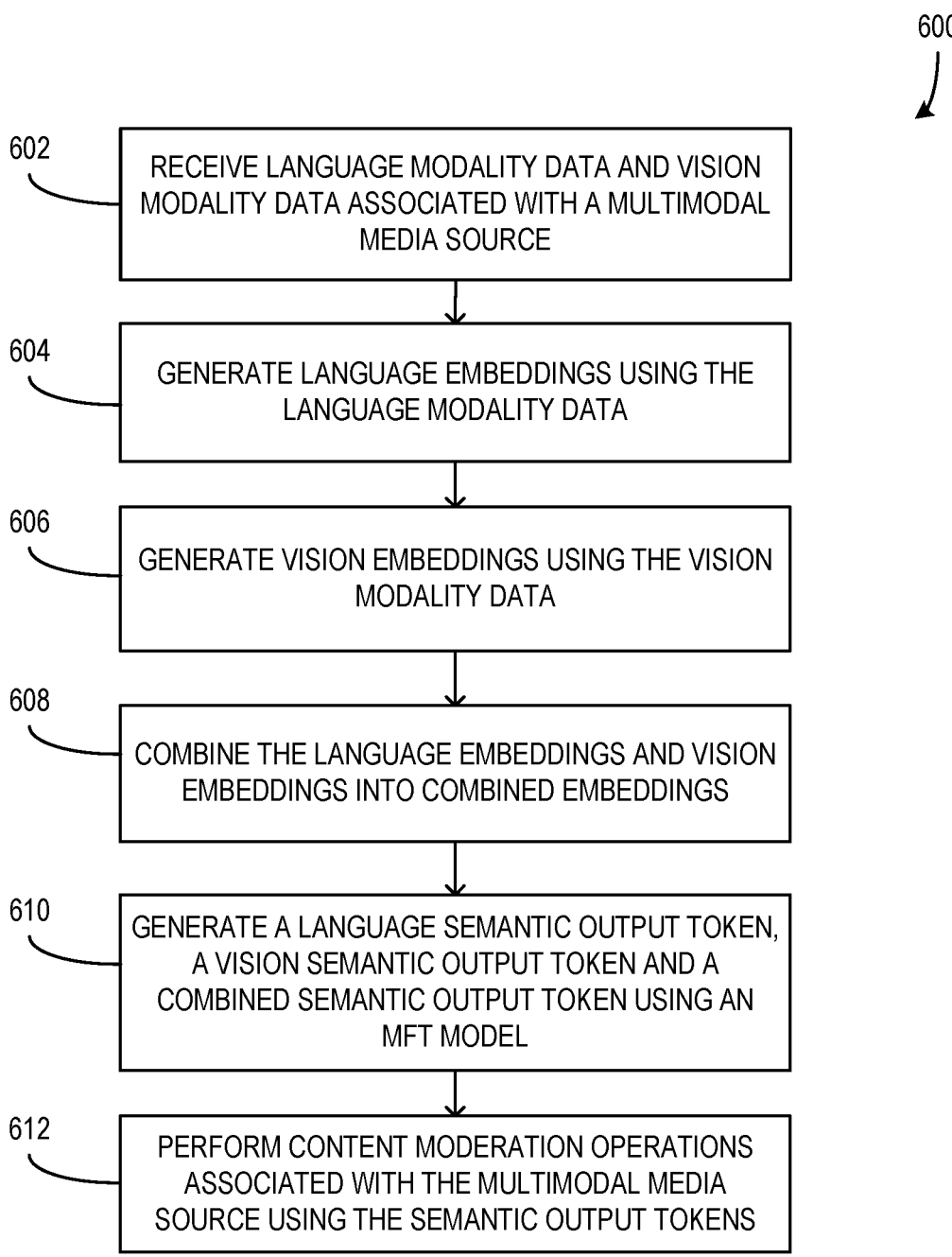

600

602 — RECEIVE LANGUAGE MODALITY DATA AND VISION MODALITY DATA ASSOCIATED WITH A MULTIMODAL MEDIA SOURCE

604 — GENERATE LANGUAGE EMBEDDINGS USING THE LANGUAGE MODALITY DATA

606 — GENERATE VISION EMBEDDINGS USING THE VISION MODALITY DATA

608 — COMBINE THE LANGUAGE EMBEDDINGS AND VISION EMBEDDINGS INTO COMBINED EMBEDDINGS

610 — GENERATE A LANGUAGE SEMANTIC OUTPUT TOKEN, A VISION SEMANTIC OUTPUT TOKEN AND A COMBINED SEMANTIC OUTPUT TOKEN USING AN MFT MODEL

612 — PERFORM CONTENT MODERATION OPERATIONS ASSOCIATED WITH THE MULTIMODAL MEDIA SOURCE USING THE SEMANTIC OUTPUT TOKENS

FIG. 6

TRAINING AND USING A MODEL FOR CONTENT MODERATION OF MULTIMODAL MEDIA

BACKGROUND

There is a rapidly growing need for multimodal content moderation (CM) as more and more content on social media is multimodal in nature. Existing unimodal CM systems may fail to catch harmful content that crosses modalities (e.g., memes or videos), which may lead to severe consequences. With the proliferation of multimodal social media and online gaming, user-generated content followed by recent Artificial Intelligence (AI)-generated content (e.g., DALL-E, GPT-3, etc.) can spread across the internet at a faster rate than ever. While this enables free speech and facilitates information exchange, it comes with the risk of misuse for fake news and hate speech. Leaving harmful content on social platforms can lead to harmful consequences but moderating the tremendous amount of user/AI-generated content on the platforms manually is infeasible due to the large scale and can be harmful to the mental health of human moderators.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training and using a multimodal fusion transformer (MFT) model is described. Language modality data and vision modality data associated with a multimodal media source is received. Language embeddings are generated from the language modality data and vision embeddings are generated from the vision modality data. Both kinds of embeddings are generated using operations and/or processes that are specific to the associated modalities. The language embeddings and vision embeddings are combined into combined embeddings and the MFT model is used with those combined embeddings to generate a language semantic output token, a vision semantic output token, and a combined semantic output token. Contrastive loss data is generated using the three semantic output tokens and the MFT model is adjusted using that contrastive loss data. After the MFT model is trained sufficiently, it is configured to perform content moderation operations using one or more of the three semantic output tokens.

BRIEF DESCRIPTION OF THE DRAWINGS

The present description will be better understood from the following detailed description read considering the accompanying drawings, wherein:

FIG. 4 is a flowchart illustrating an example method for training a multimodal fusion transformer to generate semantic output associated with a first modality and a second modality:

FIG. 5 is a flowchart illustrating an example method for fine-tuning a multimodal fusion transformer to evaluate media for content moderation:

FIG. 6 is a flowchart illustrating an example method for using a trained multimodal fusion transformer to perform content moderation.

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Figure 1:
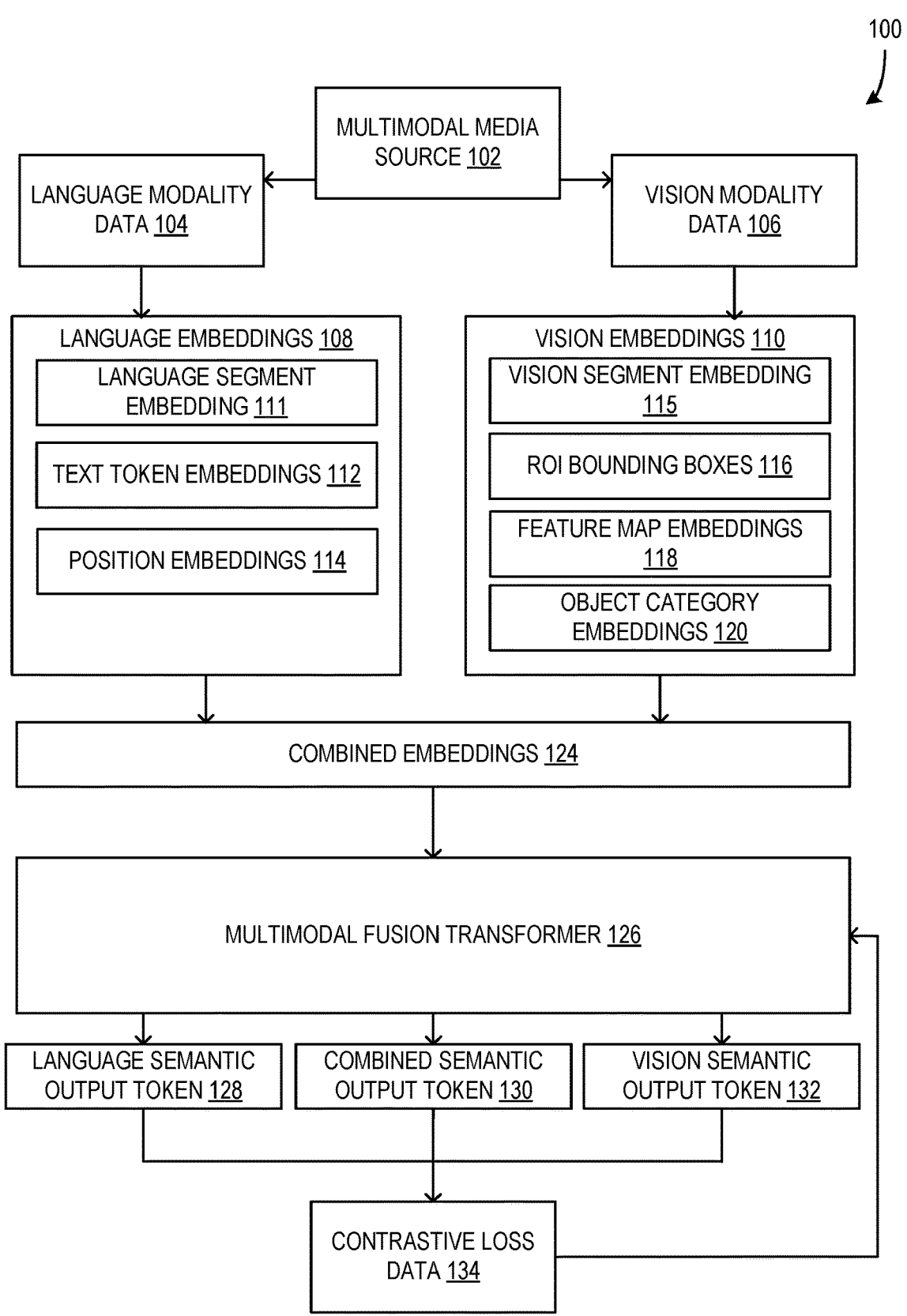
FIG. 1 is a block diagram illustrating an example system configured for training a multimodal fusion transformer using contrastive loss data.

Aspects of the disclosure provide a system and method for training a Multimodal Fusion Transformer (MFT) model to generate multimodal semantic output associated with input multimodal media sources and for performing Content Moderation (CM) operations based on that multimodal semantic output. The disclosure is configured to generate embeddings for each modality of the multiple modalities of an input using methods that are specific to those modalities, where a modality is a mode or way in which information is expressed in the input (e.g., a language modality expresses information via text, a vision modality expresses information in a picture or image, an audio modality expresses information through speech, music, or other audible sound). For instance, embeddings that capture semantic information of text or language are generated in a different way than embeddings that capture semantic information of an image. Those embeddings are combined and provided to the MFT model, which generates several semantic output tokens. A language semantic output token is generated based on the language embeddings, a vision semantic output token is generated based on the vision embeddings, and a combined semantic output token is generated based on the combined set of the language embeddings and vision embeddings. Contrastive loss data is generated using this combination of semantic output tokens and that contrastive loss data is then used to train the MFT model, such that the MFT model is trained to more accurately produce output that reflects the semantic meaning of the combined modalities, rather than semantic meanings from single sets of modality data. In some examples, other types of loss are also used to train the MFT model, including masked language modeling (MLM) loss, image-text matching (ITM) loss, masked region of interest (RoI) loss, domain-specific classification loss, and/or content moderation (CM) loss without departing from the description.

The disclosure operates in an unconventional manner at least by generating embeddings for different modalities using processes that are specific to those modalities. Because language modality data and vision modality data differ significantly in quantity, format, and associated patterns, the disclosure describes the generation of associated embeddings using different methods that highlight the types of information present in each modality and that result in embeddings that can be combined in an effective way. The disclosed embedding generation processes are the first step in preserving and using the information in different modalities through the embedding generation process and enabling the generation of semantic meaning output that reflects the combination of information from the different modalities.

Further, the disclosure describes training a multimodal fusion transformer (MFT) using contrastive loss data that focuses on the semantic meaning of the combination of the multiple modalities of the input media source. By training the MFT using the described contrastive loss data, the accuracy of the MFT at determining or otherwise generating semantic meaning that reflects the combination of the multiple modalities in the input is increased. By increasing the accuracy of the MFT for generating semantic meaning of multimodal media, the use of the semantic meaning output of the MFT in other applications (e.g., content moderation of media) is made more efficient. For instance, using the accurate semantic meaning output of the described MFT to moderate content results in a content moderation process that is quicker, more automated, and less demanding of computing resources such as processors, memory, and/or data storage resources.

The disclosure describes the use of a content moderation model (the Asymmetric Mixed-Modal Moderation (AM3) model) that can target both multimodal and unimodal content moderation tasks. For example, to address the asymmetry in semantics between vision and language (VL), the disclosure describes a novel asymmetric fusion architecture that is designed to not only fuse the common knowledge in both modalities but also to exploit the unique information in each modality. Unlike previous works that focus on fusing the two modalities while overlooking the intrinsic difference between the information conveyed in multimodality and in unimodality (e.g., the asymmetry in modalities), the disclosure describes the use of a novel cross-modality contrastive loss to learn the unique knowledge that only appears in multimodality. This is useful because some harmful intent may only be conveyed through the intersection of both modalities. Unlike previous works that only use multimodal VL datasets for pretraining, the disclosure mixes the VL datasets with unimodal image/text datasets in pretraining, leveraging asymmetric training data to improve the performance. This also relaxes the constraint of presence of both modalities so that more unimodal data can be leveraged for training.

One example of multimodal content is memes, which are a combination of image and short text. Understanding memes is a multimodal vision language task (VL). It is the overall context that determines whether the intent is harmful or not. For instance, in an example, a meme includes innocuous text combined with an image that is also innocuous alone. However, when combining the two modalities the meme becomes sarcastic and mean.

Image and text are intrinsically different in the information they convey. Text is more structured and usually describes the main components of an image while overlooking the subtle details, especially the background. On the other hand, image is unstructured: it is composed of pixels that can provide more low-level details of the context, but there is no structural bound between objects with little or no clue of the information it wants to convey. For example, an image caption is likely to focus on the foreground or the objects of interest in the image. It may contain semantic details like the color or shape of the objects, but it is unlikely to cover all the details, especially those in the background. This can be described as asymmetry in semantics of VL content. To address this asymmetry, the disclosure describes a novel fusion transformer architecture that attempts to maintain the unique knowledge in each modality while fusing the information from the asymmetric semantic levels through the connection in common object anchors. The knowledge learned from the joint multimodality media can contrast that from each unimodality due to this asymmetry in semantics. Sometimes this subtle missing part in unimodality is the determinant for content moderation decisions. The discrepancy in the information conveyed by multimodality and each unimodality separately can be described as asymmetry in modalities. To address this challenge, the disclosure describes a novel contrastive loss between the representation learned from multimodality versus each unimodality.

In previous VL works, the model is first pretrained on a large scale VL dataset, and then finetuned for downstream tasks. In both pretrain and finetune stages, all the data used contains both image and text modalities. In the disclosure, this constraint is relaxed by mixing a multimodal dataset with additional unimodal CM datasets in pretraining. This is asymmetry in data as either modality may be missing in the data, so that the conventional multimodality (e.g, . . . each sample contains both modalities) setup becomes mixed-modality (e.g., . . . a mix of multimodality and unimodality, where each sample may contain both modalities or each unimodality). By including unimodal CM dataset in pre-training, the disclosed model learns the domain-specific knowledge which helps the model adapt to the downstream tasks. Hence, the downstream CM task performance is improved.

The disclosure uses asymmetries in semantics, modalities, and data to train and use a model for generating semantic meaning output of multimodal media and, additionally, to perform content moderation operations based on that semantic meaning output. The disclosure describes a novel fusion transformer architecture to fuse different modalities asymmetrically. It enhances the unique knowledge in each modality while effectively fusing the information from the asymmetric semantic levels through the common object anchors. The disclosure describes the use of a novel contrastive loss to isolate the distinct knowledge that only exists in multimodality, which is used to improve multimodal content moderation. The disclosure also describes the use of an asymmetric dataset in multimodal pretraining, which relaxes the constraint on data modalities so that more data can be included for training. The disclosure injects domain-specific knowledge which helps the model adapt to the downstream tasks, leading to new state-of-the-art performance across CM benchmarks.

The disclosure is configured to construct vision and language embeddings differently to encourage the model to capture essential knowledge in each modality. Meanwhile, the disclosure uses object labels from detection as anchors to bridge the language with the corresponding image region of interest (RoI) features. Due to the asymmetry in modality, there is unique knowledge that only exists in the intersection of both modalities. To drive the model to obtain understanding of this, the disclosure introduces a novel contrastive loss, Cross-modality Contrastive Loss, as part of the pre-training tasks. An asymmetric mix of multimodal datasets and domain-specific unimodal datasets are used in pretraining, where a domain-specific classification loss is included to improve downstream task performance.

FIG. 1 is a block diagram illustrating an example system 100 configured for training a multimodal fusion transformer (MFT) 126 using contrastive loss data 134. In some examples, language modality data 104 and vision modality data 106 are extracted from a multimodal media source 102. Language embeddings 108 are generated from the language modality data 104 and vision embeddings 110 are generated from the vision modality data 106. The language embeddings 108 and the vision embeddings 110 are combined into combined embeddings 124 and provided to the MFT 126 as input. The MFT 126 is transformer model that is configured to generate a language semantic output token 128, a combined semantic output token 130 and a vision semantic output token 132. In other examples, the MFT 126 is configured to generate a combined semantic output token 130 using a combination of modality embeddings based on input modality data of a plurality of modalities and to generate modality-specific semantic output tokens (e.g., the language semantic output token 128 and the vision semantic output token 132) using modality embeddings based on input modality data of specific modalities. The tokens 128, 130, and 132 are used to generate contrastive loss data 134. Parameters and/or other aspects of the MFT 126 are adjusted based on the contrastive loss data 134 to train the MFT 126 to produce semantic output that is focused on the semantic meaning of the combination of the language modality and the vision modality of a multimodal media source, rather than semantic meanings of the language modality and/or vision modality alone.

Further, in some examples, the system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the devices that extract the language modality data 104 and/or vision modality data 106 are separate from the device or devices upon which the MFT 126 is located and/or executed. Thus, the generation of language embeddings 108 and/or 110 are performed on one device or set of devices while the operations of the MFT 126 are performed on another device or set of devices and the combined embeddings 124 and/or other associated data are communicated via network connections in the system 100. It should be understood that, in some examples, the training of the MFT 126 using machine learning techniques as described herein can benefit from the use of multiple computing devices performing operations in parallel and the system 100 is configured to use distributed computing devices to perform the operations as described herein. In still other examples, other organizations of computing devices are used to implement the system 100 without departing from the description.

In some examples, the multimodal media source 102 is a single entry in a set of training data. The set of training data includes entries that are media files or other entities that have multiple modalities of associated data, such as image files with text, video files including audio modalities and video modalities, or the like. In many examples described herein, those modalities include a language modality (e.g., text displayed on the multimodal media source 102) and a vision modality (e.g., image(s) of objects or other entities on the multimodal media source 102). For instance, the multimodal media source 102 is an internet meme featuring a picture with overlaid text in some examples. However, in other examples, other types of multimodal media sources 102 are used without departing from the description. For instance, in another example, the multimodal media source 102 is a video file that includes a video modality that includes data expressing information in the form of changing images over time via a series of frames, an audio modality that includes data expressing information through speech, music, sound effects, or other audible sounds that are synchronized with the video modality, and a language modality associated with text displayed in some of the frames of the video. In such an example, the system 100 may be configured to separate the three modalities, generate embeddings for each of the modalities using embedding generation techniques that are specific to the corresponding modalities, and then combine those embeddings into combined embeddings 124 for use by the MFT 126 as described herein.

The language modality data 104 and vision modality data 106 are extracted from the multimodal media source 102 using analysis of the multimodal media source 102. In some examples, the language modality data 104 is extracted using a model that is trained to identify words, phrases, and/or other language in images. Additionally, or alternatively, the vision modality data 106 is extracted using a model that is trained to identify objects and/or other shapes in images. In some such examples, the language modality data 104 includes text data including words, phrases, or the like in the order in which they appear in the multimodal media source 102. The vision modality data 106 includes image data that is separate from the extracted language modality data 104.

In other examples, other modalities include other types of modality data, which is data of any format that describes information that is displayed or otherwise expressed in a particular type of modality (e.g., language modality data as described herein includes data representing words, phrases, or other language information but language modality data does not contain data representing pixel color and/or location, which would be part of vision modality data as described herein). For instance, in an example, a video modality includes information describing objects detected in the video, locations of such detected objects, and/or movement of such detected objects throughout the video. These types of information are expressed or represented in modality data of the video modality, or video modality data (e.g., data representing color and/or location of pixels in a frame). Additionally, or alternatively, a multimodal media source 102 that includes video and audio modalities includes audio modality data that describes words or phrases spoken as part of the audio, music or sound effects that play as part of the audio, and/or timing information for when such audio is played with respect to the runtime of the multimodal media source 102. These types of information are expressed or represented in modality data of the audio modality, or audio modality data. In still other examples, other types of modalities are used that yield other types of modality data without departing from the description.

In some examples, the system 100 is configured to generate the language embeddings 108 from the language modality data 104 using trained language model(s) or parts thereof (e.g., an embedding layer of a transformer). For instance, in an example, the generation of the language embeddings 108 includes tokenizing the language modality data 104 into a set of language tokens and then mapping those language tokens to text token embeddings (e.g., text token embedding vectors as generated by embedding layers of a transformer). The language embeddings include text token embeddings 112 and position embeddings 114. The text token embeddings 112 include tokens of semantic data corresponding to specific words, phrases, symbols, or the like in the language modality data 104. The position embeddings 114 include position data that represents the positions of each corresponding text token embeddings 112 relative to each other (e.g., the first token has a position embedding 114 indicating that it is first, before the second token).

Additionally, in some examples, the system 100 is configured to generate the vision embeddings 110 from the vision modality data 106 using trained object detection model(s) and/or other vision model(s). For instance, in an example, the generation of the vision embeddings 110 includes using a region-based convolutional neural network (R-CNN) to propose regions of the image in the vision modality data 106, extract features from those regions, and classify objects in the proposed regions using the extracted features. In some such examples, the object classification data is then transformed into a text token embedding using the language model described above with respect to the language embeddings 108. Alternatively, or additionally, different types of the vision embeddings 110 are generated in different ways without departing from the description (e.g., feature map embeddings 118 are generated using a vision transformer while object category embeddings 120 are generated using a convolutional neural network such as Faster R-CNN). The vision embeddings 110 include region of interest (RoI) bounding boxes 116, feature map embeddings 118 associated with each of those bounding boxes 116, and object category embeddings 120 associated with objects that are identified in those bounding boxes 116. In some such examples, the image area represented by the vision modality data 106 is divided into portions and the positions of those portions in the image area are represented by the RoI bounding boxes 116 (e.g., a RoI bounding box 116 includes data indicative of the position of and/or boundaries of a region of the image area represented by the vision modality data 106). Each portion is analyzed using a vision model, and feature data is extracted and used to generate feature map embeddings 118 (e.g., feature vectors that represent visual information of the vision modality data 106 present in each RoI bounding box 116). When an object is identified in a portion of the vision modality data 106, an object category embedding 120 is generated for that object, wherein the object category embedding 120 includes semantic data that describes a category to which the object belongs. The object category embeddings 120 are similar in format to the text token embeddings 112, such that, when combined, the set of these token embeddings in the combined embeddings 124 include semantic data for each word or phrase in the language modality data 104 and semantic data for each identified object in the vision modality data 106.

In an embodiment, the language modality data 104 is tokenized through a tokenizer and then provided to a token embedding layer to generate the text token embeddings 112, which are associated with corresponding position embeddings 114 and a language segment embedding 111 associated with the language modality. The vision modality data 106 is analyzed using an object detection model (e.g., the R-CNN described above) that detects objects present in the image. A RoI bounding box 116 is defined surrounding the entire image without an associated object category and, for each detected object, a category label and RoI bounding box 116 is generated. The category labels are processed using the token embedding layer used to generate the text token embeddings 112, such that the object category embeddings 120 are semantically comparable to the text token embeddings 112. The bounding boxes of the detected objects are included with the RoI bounding boxes 116 in the vision embeddings 110. The visual features of each RoI are then encoded through a feature extractor to generate the feature map embeddings 118. The RoI bounding boxes 116, the feature map embeddings 118, and the object category embeddings 120 are combined with (e.g., added to) a vision segment embedding 115 associated with the vision modality to form the vision embeddings 110. The concatenated pair of the language embeddings 108 and the vision embeddings 110 form the combined embeddings 124, which are provided to the MFT 126 as described herein.

Segment embeddings, such as the language segment embedding 111 and the vision segment embedding 115, are embedding vectors that are specific to modalities. The segment embeddings are used to label associated embeddings to indicate a modality type with which the labeled embeddings are associated. For instance, a particular data value (e.g., 0, 1, 12) is defined as the segment embedding value for language embeddings 108 and each embedding of the language embeddings 108 is combined with or labeled with the segment embedding value (e.g., the segment embedding value concatenated to a language embedding 108 at the beginning or end of that language embedding 108). The segment embeddings are combined with other embeddings of that modality to provide the MFT 126 information as to the modality to which a particular embedding belongs. For instance, in one example, a text token embedding of the language modality is combined with a position embedding indicative of the location of the token within the language modality data and a segment embedding that indicates that the text token embedding is associated with the language modality. In some such examples, such segment embeddings are defined as constant values that are different for each modality (e.g., a language segment embedding 111 is defined as a '1' value and a vision segment embedding 115 is defined as a '2' value). The segment embedding of a particular modality is concatenated with each other embedding of that modality, providing that modality information to the MFT 126.

The combined embeddings 124 are the grouped embeddings associated with all modalities of a multimodal media source 102. The different sets of embeddings within the combined embeddings 124 are grouped based on the modality from which the embeddings were generated, and that grouping is achieved through the use of segment embeddings in some examples, as described above. The combined embeddings 124 are provided to the MFT 126 as input in order to enable the MFT 126 to analyze the embeddings from different modalities simultaneously and to generate output that is indicative of the semantic meaning of the combined modalities of the multimodal media source 102.

Further, in some examples, classification tokens, or CLS tokens, are included in the combined embeddings 124, wherein the CLS tokens are generated to summarize data in portions of or all of the modality data. The CLS tokens include a combined CLS token that summarizes all multimodal knowledge from all tokens in the combined embeddings 124, a language CLS token that summarizes information in the tokens of the language segment of the combined embeddings 124, and a vision CLS token that summarizes information in the tokens of the vision segment of the combined embeddings 124. These CLS tokens are used by the MFT 126 during the generation of the semantic output tokens 128, 130, and/or 132.

In other examples, other types of modalities are used, and other types of modality embeddings are generated using data of those other types of modalities. Modality embeddings are generated from modality data to be indicative of semantic meaning, spatial position, temporal position, or other aspects that describe data entries in the sets of modality data. The generation of modality embeddings is configured specifically for each modality type. This is demonstrated herein with respect to the language modality, which includes tokenization of language modality data and generation of text token embeddings for each token, and the vision modality, which includes determination of RoI bounding boxes using vision modality data, detection and classification of objects positioned within the RoI bounding boxes, and generation of feature maps associated with the RoI bounding boxes.

The MFT 126 includes hardware, firmware, and/or software configured to generate output that includes semantic data that is reflective of the semantic meaning or meanings that are present in a multimodal media source as input, such as the multimodal media source 102. As illustrated, the MFT 126 is a Machine Learning (ML) model that can be trained and/or fine-tuned to improve its performance at performing its task. For instance, in an example, the MFT 126 has a plurality of parameters that it uses when performing operations on input data to generate the semantic output data. Output data from the MFT 126 is analyzed to determine how accurate it is and then some or all of those plurality of parameters are adjusted to improve the accuracy of the MFT 126 in future iterations. In other examples, other machine learning techniques are used without departing from the description.

The output of the MFT 126 includes a language semantic output token 128, a combined semantic output token 130, and a vision semantic output token 132. In some examples, the language semantic output token 128 is generated based only on the language embeddings 108 and the vision semantic output token 132 is generated based only on the vision embeddings 110. The combined semantic output token 130 is generated based on the combined embeddings 124. In some examples, the generation of each type of output token 128, 130, and 132 is done by masking out portions of the input data when operations are being performed by the MFT 126. For instance, in an example, the language semantic output token 128 is generated by masking out embeddings associated with the vision modality, including a vision CLS token and a combined CLS token, which includes vision information. As a result of these masks, the MFT 126 generates the language semantic output token 128 from the language embeddings 108 and an associated language CLS token if it is present. Similarly, the vision semantic output token 132 is generated by masking out embeddings associated with the language modality, including a language CLS token and a combined CLS token, which includes language information. As a result of these masks, the MFT 126 generates the vision semantic output token 132 from the vision embeddings 110 and an associated vision CLS token if it is present. For the combined semantic output token 130, both sets of embeddings 108 and 110 are used, but in some examples, only the combined CLS token is used and the language CLS token and vision CLS token are masked (the CLS token already includes information from both modalities and using the modality specific CLS tokens is redundant).

It should be understood that, in some examples, when the MFT 126 is sufficiently trained using the methods described herein, the MFT 126 is used to determine semantic meanings of multimodal media sources 102 and those determined semantic meanings are used to perform associated operations or the like. For instance, in some examples described herein, the semantic meaning information is used to determine whether a particular multimodal media source 102 is a candidate for moderation based on its meaning (e.g., if the multimodal media source has an unacceptable semantic meaning according to a hosting entity, it is blocked or moderated in some other manner). The combined semantic meaning determined by the MFT 126 as described herein is provided to another analysis layer or entity that is configured to evaluate that meaning. In some such examples, the combined semantic meaning is categorized or otherwise mapped to a category indicating that the input is a candidate for moderation or to a category indicating that the input is not a candidate for moderation. Other categories exist in other examples, such as a category indicating that the input is a candidate for manual review or a category indicating that the input is a candidate for automated moderation.

In another example, the trained MFT 126 is used for disambiguation of translated text when that text is associated with some other modality, such as an image or video. For instance, in an example, a system is configured to translate spoken language in a film to another language. The system inevitably identifies ambiguities in the translation and uses the described system to evaluate the semantic meaning of a portion of the film by analyzing multiple modalities (e.g., objects that are on screen at the time an ambiguous line is spoken or actions being performed by characters when an ambiguous line is spoken). In some cases of ambiguity, the additional context provided by the combined semantic meaning of the modalities of the film enables the translation system to disambiguate the translated text. In other examples, the semantic output of the MFT 126 is used for other purposes without departing from the description.

To train the MFT 126 to accurately generate semantic meaning information that captures the combined meaning of both the language modality and the vision modality of the multimodal media source 102, contrastive loss data 134 is generated and used to train the MFT 126. The contrastive loss data 134 is generated to account for the asymmetry of the different modalities and to enable the MFT 126 to capture the knowledge existing at the intersection of the different modalities. For instance, in an example with a multimodal media source 102 that has both an image and overlaid text, both the image and text alone are innocuous, but when combined and considered together a different, perhaps more harmful, meaning becomes apparent. Thus, the generated contrastive loss data 134 focuses on semantic meaning information associated with the combination of both modalities while avoiding semantic meaning information that is present in one modality on its own.

For instance, in an example, the contrastive loss data 134 is generated by calculating or otherwise determining similarity values between the language semantic output token 128, the vision semantic output token 132, and the combined semantic output token 130. The resulting similarity values are combined to obtain the contrastive loss value of the contrastive loss data 134. In some such examples, the similarity values are cosine similarity values between the language semantic output token 128 and the combined semantic output token 130 and between the vision semantic output token 132 and the combined semantic output token 130, as shown in equation 1 below, but in other examples, other types of similarity calculation are used without departing from the description. The MFT 126 is then trained to reduce the resulting contrastive loss value to zero. Thus, the joint multimodal representation generated by the MFT 126 in the form of the combined semantic output token 130 is differentiated from the unimodal representations in the form of the language semantic output token 128 and vision semantic output token 132, forcing the MFT 126 to learn the distinct semantic knowledge that is present in the intersection of both modalities. This example of cross-modality contrastive loss is further described below in equation 1, in which the contrastive loss $L_{con}$ is the sum of the maximum of zero and the cosine similarity of the combined token $f_{VL}$ and the language token $f_L$ and the maximum of zero and the cosine similarity of the combined token $f_{VL}$ and the vision token $f_V$.

$$L_{con} = \max(0, \cos(f_{VL}, f_L)) + \max(0, \cos(f_{VL}, f_V)) \qquad (1)$$

It should be understood that, while the system 100 as illustrated is configured to perform the described operations based on language and vision modalities, in other examples, more and/or different types of modalities are used in system 100 without departing from the description.

Figure 2:
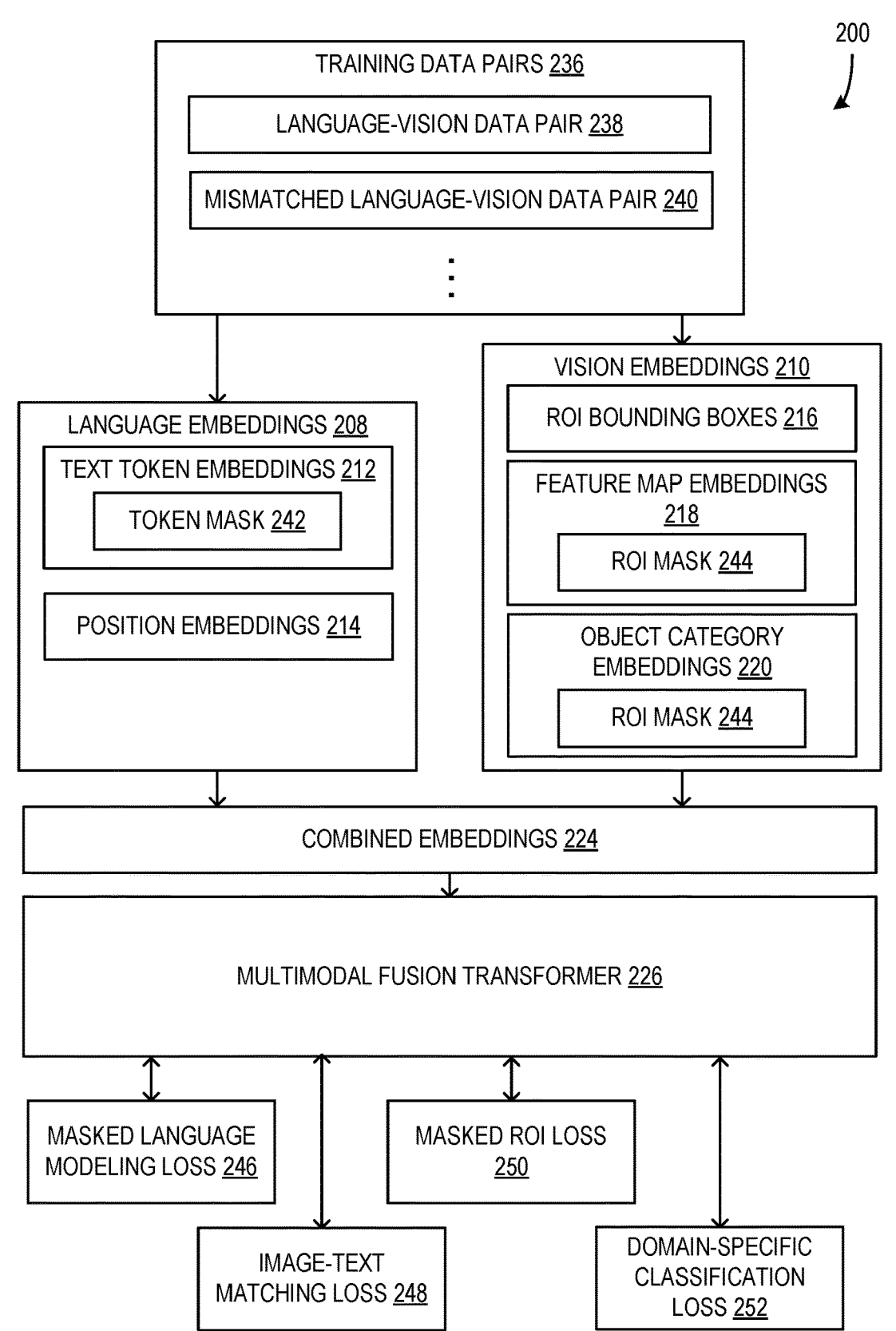
FIG. 2 is a block diagram illustrating an example system configured for training a multimodal fusion transformer using multiple types of loss data.

FIG. 2 is a block diagram illustrating an example system 200 configured for training a multimodal fusion transformer (MFT) 226 using multiple types of loss data (e.g., Masked Language Modeling (MLM) loss 246, Image-Text Matching (ITM) loss 248, Masked RoI loss 250, and domain-specific classification loss 252). In some examples, the system 200 is the same as or part of a system such as system 100 of FIG. 1. In some examples, training data pairs 236 are used to generate language embeddings 208 and vision embeddings 210. The embeddings 208 and 210 are combined into combined embeddings 224 and provided to the MFT 226 as input. The output of the MFT 226 includes output tokens, such as the semantic output tokens 128, 130, and/or 132 described above, and/or other output data associated with the other types of loss described below, which are used to generate the various loss data that is used to train the MFT 226 to improve its performance.

In some examples, the training data pairs 236 includes language vision data pairs 238 that are the same as the multimodal media source 102 of system 100 as described above. The training data pairs 236 are used to iteratively train the MFT 226 using machine learning techniques. Further, in some such examples, the training data pairs 236 include one or more mismatched language-vision data pairs 240 that are used to generate the ITM loss 248 and train the MFT 226 to determine whether the text and image of a language-vision data pair 240 match semantically. For instance, mismatched language-vision data pairs 240 are generated by replacing the original text of a language-vision data pair 238 with randomly-chosen text from another language-vision data pair 238. The MFT 226 generates a combined semantic output token 130 based on a language-vision data pair 238 or a mismatched language-vision data pair 240. Then, the combined semantic output token 130 is processed using a linear layer that projects the combined semantic output token 130 to a binary logit to indicate whether the given image and text match or not.

For instance, in an example, the ITM loss $L_{itm}$ is represented by the equation 2 below, where $f_{VL}$ is the MFT 226 output and c is the matching classification label (c=1 if the text and token match and c=0 otherwise).

$$L_{itm} = -E_{f_{VL}}[\log P(c \mid f_{VL})] \qquad (2)$$

Further, in some examples, the language embeddings 208 include text token embeddings 212 and position embeddings 214 and a portion of the text token embeddings 212 are masked with a token mask 242 (e.g., a token that indicates that the actual token is masked, rather than a token that includes semantic information). The output of the MFT 226 is then used to attempt to determine what token has been masked and the accuracy of this determination is calculated as the MLM loss 246. That MLM loss 246 is then used to train and/or otherwise adjust the MFT 226 to improve its accuracy at determining masked or missing text tokens based on the surrounding text tokens and/or other associated embedding information.

For instance, in an example, the MLM loss $L_{mlm}$ is represented by the equation 3 below, where $f_{VL}$ is the MFT 226 output and $t_m$ denotes the text tokens masked by token masks 242.

$$L_{mlm} = -E_{f_{VL}}[\log P(t_m \mid f_{VL})] \qquad (3)$$

Additionally, or alternatively, the vision embeddings 210 include RoI bounding boxes 216, feature map embeddings 218, object category embeddings 220, and/or other vision embeddings (e.g., vision segment embedding 115). In some examples, a portion of embedding data associated with one or more of the RoI bounding boxes 216 are masked using RoI masks 244. For instance, in an example, an RoI mask 244 is applied to feature map embeddings 218 and object category embeddings 220 associated with one RoI bounding box of the RoI bounding boxes 216. The output of the MFT 226 is then used with the visual information of the masked embeddings to generate the masked RoI loss 250. The masked RoI loss 250 is used to train the MFT 226 to better predict visual information in a bounding box based on corresponding language tokens and/or other associated information.

For instance, in an example, the masked RoI loss $L_{roi\text{-}cis}$ is represented by the equation 4 below, where $f_{VL}$ is the MFT 226 output and $c_v$ denotes the object category tokens or scores detected by the object detection model.

$$L_{roi\text{-}cis} = -E_{f_{VL}}[\log P(c_v \mid f_{VL})] \qquad (4)$$

Further, in some examples, the MFT 226 is used to generate domain-specific classification loss 252 that is then used to train the MFT 226 to more accurately generate semantic output based on input associated with a particular domain. When training the MFT 226 for domain-specific performance, the training data pairs 236 include or consist entirely of domain-specific training data pairs 236. For instance, in an example where the MFT 226 is being trained to process media sources for content moderation, the training data pairs 236 include instances of media that would be considered for content moderation and indications of whether those instances of media are candidates for moderation based on their content. By iteratively training the MFT 226 using large quantities of domain-specific training data, the MFT 226 becomes more accurate at determining semantic meaning from input in that domain.

For instance, in an example, the domain-specific classification loss $L_{domain}$ is represented by equation 5 below, where $f_{VL}$ is the MFT 226 output and $c_d$ denotes the domain category label (e.g., the indicator as to whether the input is a candidate for moderation in the content moderation example described above).

$$L_{domain} = -E_{f_{VL}}[\log P(c_d \mid f_{VL})] \qquad (5)$$

It should be understood that, in some examples, the pre-training of the MFT 226 is performed using one, some, or all of the contrastive loss data 134, MLM loss 246, ITM loss 248, masked RoI loss 250, and domain-specific classification loss 252. In other examples, more, fewer, or different types of loss are used to pretrain the MFT 226 without departing from the description.

It should be understood that, while many of the examples herein describe the MFT 226 being trained using various types of loss data, in some examples, other parts of the systems 100 and 200 are being trained based on some of those types of loss data. For instance, a model configured to generate text token embeddings or to identify objects in an image may be trained using some or all of the types of loss data in addition to or instead of the MFT 226 being trained. Additionally, or alternatively, some trainable components of the system 200 are frozen during the training of the MFT 226, such that they are not trained or otherwise affected by the loss data being generated and/or the training of the MFT 226.

Figure 3:
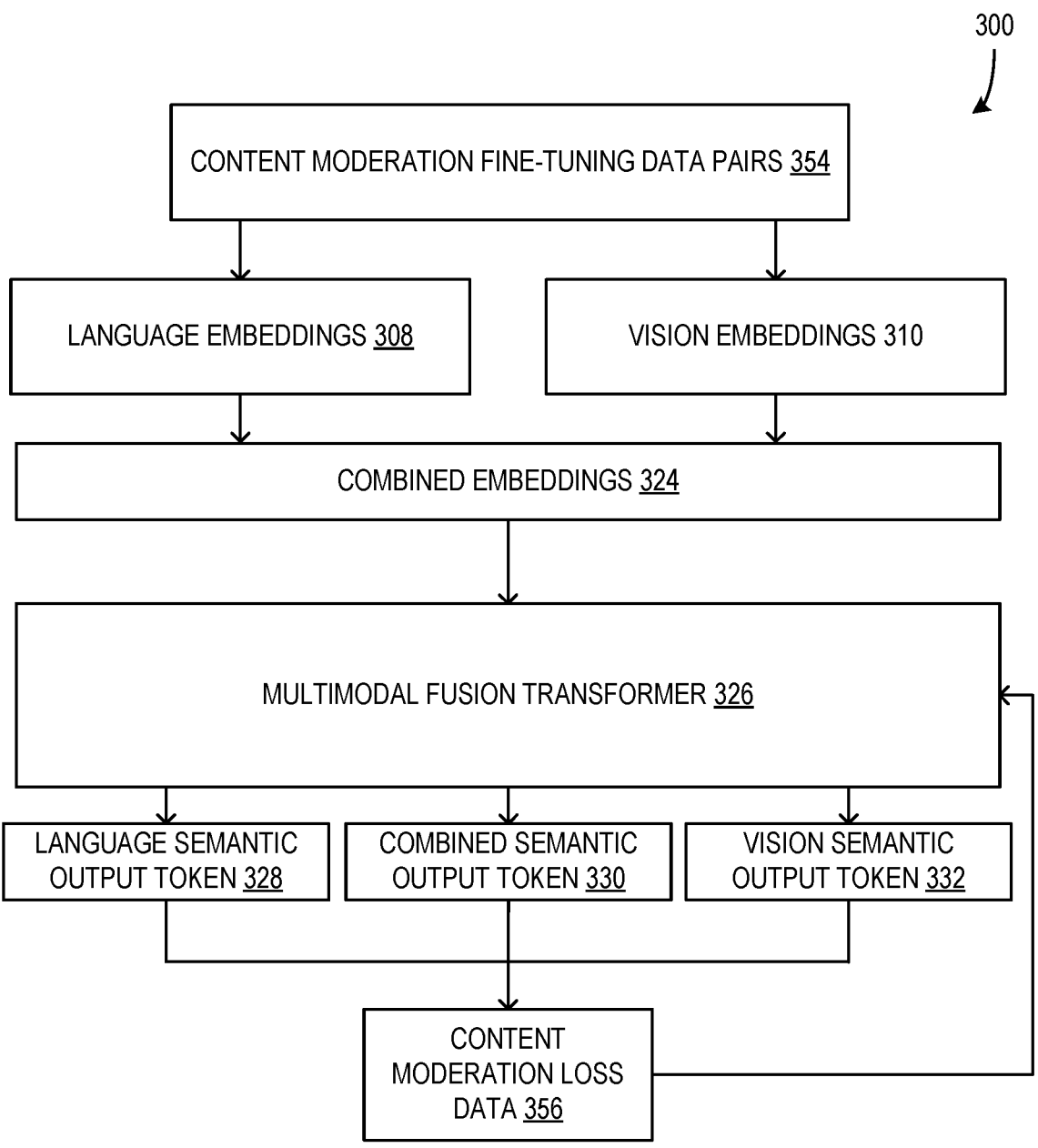
FIG. 3 is a block diagram illustrating an example system configured for fine-tuning a multimodal fusion transformer using content moderation fine-tuning data pairs and associated content moderation loss data.

FIG. 3 is a block diagram illustrating an example system 300 configured for fine-tuning a multimodal fusion transformer (MFT) 326 using content moderation fine-tuning data pairs 354 and associated content moderation loss data 356. In some examples, the system 300 is part of or otherwise associated with a system such as systems 100 and/or 200 of FIGS. 1 and 2, respectively. For instance, in an example, the MFT 326 has been pre-trained as described above with respect to the MFTs 126 and 226.

The content moderation fine-tuning data pairs 354 are used to generate language embeddings 308 and vision embeddings 310. These embeddings 308 and 310 are combined into combined embeddings 324 and provided as input to the MFT 326. The MFT 326 generates the language semantic output token 328, the combined semantic output token 330, and/or the vision semantic output token 332 and, from one or more of these tokens 328, 330, and/or 332, content moderation loss data 356 is generated. The content moderation loss data 356 is then used to fine-tune the parameters of the MFT 326 to improve its accuracy at determining whether a particular media source (e.g., multimodal media source 102) is a candidate for moderation based on its semantic meaning.

In some examples, the content moderation fine-tuning data pairs 354 include real instances of media sources that are labeled either "harmful" or "safe". When an instance is harmful, it is a candidate for moderation and the MFT 326 is fine-tuned to provide an indication that content moderation operations be performed while an instance that is safe is not a candidate for moderation and the MFT 326 is fine-tuned to provide an indication that content moderation operations not be performed. Additionally, or alternatively, in some such examples, the content moderation fine-tuning data pairs 354 further include instances of multimodal media that are from large datasets such as, for example, the Hateful Memes dataset, the MMHS150K data set, and/or the Fakeddit dataset. In other examples, more, fewer, or different types of data pairs are used in the content moderation fine-tuning data pairs 354 without departing from the description.

Additionally, or alternatively, in some examples, the content moderation fine-tuning data pairs 354 include data pairs with unimodal media instances (e.g., a media instance that includes a single modality, such as only text or only an image). In such examples, the MFT 326 is trained and/or fine-tuned to determine whether unimodal media are candidates for moderation as well. For instance, if an input media instance includes only text or only an image, the MFT 326 is trained to generate semantic meaning output based on that unimodal data. In some such examples, the MFT 326 is trained to determine that an input media instance only includes one modality and, in response to that determination, the MFT 326 is trained to use a semantic output token associated with that modality to make the moderation determination. For instance, if the input media instance only includes text, then the language semantic output token 328 is used to determine whether the input media instance is a candidate for moderation. Alternatively, if the input media instance only includes an image, then the vision semantic output token 332 is used to determine whether the input media instance is a candidate for moderation. In other examples, other combinations of semantic output tokens are used without departing from the description.

It should be understood that, when the MFT 326 has been pre-trained (e.g., as described above with respect to FIGS. 1 and 2) and fine-tuned using the content moderation fine-tuning data pairs 354, the MFT 326 can be used to automatically determine whether multimodal and/or unimodal media instances are candidates for moderation in real-time or near real-time. In some such examples, the fine-tuning of the MFT 326 includes training a layer to interpret the semantic output tokens 328, 330, and/or 332 and generate an indicator that indicates whether to perform content moderation operations associated with the input media instance. For instance, in an example, the generated indicator is a '1' to indicate that content moderation operations are to be performed or a '0' to indicate that content moderation operations are not to be performed.

Additionally, or alternatively, in some examples, the fine-tuning of the MFT 326 also includes the generation and use of contrastive loss as described above with respect to system 100 of FIG. 1 without departing from the description.

Further, it should be understood that, in other examples, the MFT 326 is fine-tuned for other purposes, such as disambiguation of translation in certain modalities using semantic information in other associated modalities of a particular instance of media (e.g., translation of text between languages may result in different semantic meanings based on the image associated with the original text that is being translated).

FIG. 4 is a flowchart illustrating an example method 400 for training a multimodal fusion transformer (MFT) to generate semantic output (e.g., semantic output tokens 128, 130, and/or 132) associated with a first modality and a second modality (e.g., language modality data 104 and vision modality data 106). In some examples, the method 400 is executed or otherwise performed in a system such as system 100 of FIG. 1.

At 402, the first modality data and second modality data associated with a multimodal media source (e.g., multimodal media source 102) are received. In some examples, the first modality of the multimodal media source is a language modality and the second modality of the multimodal media source is a vision modality. In other examples, more and/or different modalities are included in the multimodal media source, such as audio or video modalities.

Further, the receiving of the first and second modality data includes performing operations on the multimodal media source to extract the first and/or second modality data from that source. For instance, in some examples, the multimodal media source is an image with overlaid text and that image is processed using a trained model or other component to extract the text from the image and produce the language modality data that represents the extracted text. In other examples, other methods of extracting modality data are used without departing from the description.

At 404, first modality embeddings are generated using the first modality data and a first embedding operation of the first modality. In some examples, the generation of the first modality embeddings includes generating language embeddings (e.g., language embeddings 108) from language modality data (e.g., language modality data 104) as described herein. In some such examples, the language embeddings include text token embeddings (e.g., text token embeddings 112) and position embeddings (e.g., position embeddings 114) which are generated using operations and/or processes (e.g., a tokenizer converting words, characters, phrases, and/or other portions of the language modality data into tokens that represent semantic meanings of those data portions) that are specific to the language modality in that they generate embeddings that reflect semantic information contained in the language modality data. In other examples, the first modality is not a language modality and the operations and/or processes used to generate the first modality embeddings are instead specific to that first modality.

At 406, second modality embeddings are generated using the second modality data and a second embedding operation of the second modality. In some examples, the generation of the second modality embeddings includes generating vision embeddings (e.g., vision embeddings 110) from vision modality data (e.g., vision modality data 106) as described herein. In some such examples, the vision embeddings include RoI bounding boxes (e.g., RoI bounding boxes 116), feature map embeddings (e.g., feature map embeddings 118), and object category embeddings (e.g., object category embeddings 120) which are generated using operations and/or processes (e.g., an object detection model that detects and/or identifies objects in portions of an image, a model that classifies those detected objects into categories, and/or a component that identifies the boundaries of bounding boxes in the image) that are specific to the vision modality in that they generate embeddings reflect semantic information contained in the vision modality data. In other examples, the second modality is not a vision modality and the operations and/or processes used to generate the second modality embeddings are instead specific to that second modality.

At 408, the first modality embeddings and the second modality embeddings are combined into combined embeddings. In some examples, the combined embeddings (e.g., combined embeddings 124) include the first modality embeddings and the second modality embeddings grouped together but delineated using segment embeddings. For instance, a first modality segment embedding (e.g., a language segment embedding 111) is used with the first modality embeddings and second modality segment embedding (e.g., a vision segment embedding) is used with the second modality embeddings. Additionally, or alternatively, separator tokens are used as boundaries between tokens of the first modality embeddings and tokens of the second modality embeddings.

At 410, semantic output tokens are generated using the MFT model, including a first modality semantic output token, a second modality semantic output token, and a combined semantic output token. In some examples, the MFT model performs transformer operations on portions of the combined embeddings to generate each semantic output token. For instance, the MFT model generates the first modality semantic output token by using transformer operations on the first modality embeddings portion of the combined embeddings and the MFT model generates the second modality semantic output token by using transformer operations on the second modality embeddings portion of the combined embeddings.

In some examples, the combined embeddings further include a first modality classification token that is an aggregate representation of tokens of the first modality embeddings, a second modality classification token that is an aggregate representation of tokens of the second modality embeddings, and a combined classification token that is an aggregate representation of all the tokens of the combined embeddings. In some such examples, the generation of the semantic output tokens is done by masking some of the classification tokens. For instance, to generate the first modality semantic output token, the MFT model uses transformer operations on the first modality classification token and masks the second modality classification token and the combined classification token. To generate the second modality semantic output token, the MFT model uses transformer operations on the second modality classification token and masks the first modality classification token and the combined classification token. And to generate the combined semantic output token, the MFT model uses transformer operations on the combined classification token and masks the first modality classification token and the second modality classification token.

At 412, contrastive loss data (e.g., contrastive loss data 134) is generated using the semantic output tokens. In some examples, the generation of the contrastive loss data includes calculating or otherwise generating cosine similarity values between the first modality semantic output token and the combined semantic output token and between the second modality semantic output token and the combined semantic output token. These cosine similarity values are combined to form the contrastive loss data.

At 414, the MFT model is adjusted using the generated contrastive loss data. In some examples, the MFT model is adjusted to reduce the contrastive loss data value toward zero, resulting in the MFT model being trained to focus on generating output that represents the semantic meaning of the combined modalities, rather than semantic meaning that is present in one of the modalities alone. This adjustment process is described in greater detail above with respect to at least FIG. 1.

It should be understood that, in some examples, the method 400 is performed iteratively with a set of different multimodal media sources as training data. Further, in some examples, the training data includes multimodal media sources that are specific to a particular domain, such that the MFT model is trained to generate output that represents more accurate semantic meaning based on input from that specific domain.

Additionally, or alternatively, in some examples, the method 400 includes receiving Content Moderation (CM) indicators with associated multimodal media sources as input and the MFT model is configured to generate an indicator as to whether an input multimodal media source is a candidate for content moderation. The inclusion of the CM indicators in the training data enables the method 400 to generate CM loss data based on a comparison of the CM indicator included with the training data instance and the indicator generated by the MFT model. Such CM loss data is used to adjust the MFT model, thereby fine-tuning the MFT Model to determine whether input multimodal media sources are candidates for moderation.

It should be understood that, in some examples, the method 400 includes generation and use of other types of loss to train the MFT model, such as MLM loss (e.g., MLM loss 246), ITM loss (e.g., ITM loss 248), masked RoI loss (e.g., masked RoI loss 250, and/or domain-specific classification loss (e.g., domain-specific classification loss 252) as described herein without departing from the description.

Further, it should be understood that, while the method 400 primarily describes the use of two modalities, in other examples, more and/or different modalities are used without departing from the description. For instance, in an example, a third modality is used, such that third modality data is received, third modality embeddings are generated from the third modality data, and those third modality embeddings are included in the combined embeddings. A third modality semantic output token is generated using the MFT model and the combined embeddings and that third modality semantic output token is further used in the generation of the contrastive loss data.

FIG. 5 is a flowchart illustrating an example method 500 for training a multimodal fusion transformer (MFT) to generate semantic output (e.g., semantic output tokens 128, 130, and/or 132) associated with a language modality and a vision modality. In some examples, the method 500 is executed or otherwise performed in a system such as system 100 of FIG. 1. Further, it should be understood that, in some examples, the operations of method 500 are substantially similar to or the same as the operations described above with respect to method 400 of FIG. 4 with specific modalities of language and vision.

At 502, language modality data (e.g., language modality data 104) and vision modality data (e.g., vision modality data 106) associated with a multimodal media source (e.g., multimodal media source 102) are received.

At 504, language embeddings are generated using the language modality data and, at 506, vision embeddings are generated using the vision modality data. In some examples, 504 and 506 are performed in substantially the same way as 404 and 406 of method 400 as described above. For instance, in some examples, the language embeddings include text token embeddings and positional embeddings while the vision embeddings include RoI bounding boxes, feature map embeddings and object category token embeddings. Further, it should be understood that the generation of the language embeddings and the vision embeddings are performed by separate components at substantially the same time or in parallel without departing from the description.

Further, in some examples, the method 500 includes generating a language classification token, a vision classification token, and a combined classification token as described above with respect to method 400. The classification tokens are then included as part of the combined embeddings for use by the MFT model as input.

At 508, the language embeddings and vision embeddings are combined into combined embeddings (e.g., combined embeddings 124) and, at 510, semantic output tokens are generated using the MFT model and the combined embeddings. The semantic output tokens include a language semantic output token (e.g., language semantic output token 128), a vision semantic output token (e.g., vision semantic output token 132), and a combined semantic output token (e.g., combined semantic output token 130).

In some examples where the combined embeddings include classification tokens, some of the classification tokens and associated embeddings are masked for the generation of the semantic output tokens. For instance, to generate the language semantic output token, the language embeddings and the language classification token are used and the other embeddings and classification tokens are masked. To generate the vision semantic output token, the vision embeddings and the vision classification token are used and the other embeddings and classification tokens are masked. And to generate the combined semantic output token, the language embeddings, vision embeddings, and combined classification token are used and the other classification tokens are masked.

At 512, the contrastive loss data is generated using the semantic output tokens. In some examples, the generation of the contrastive loss data includes calculating or otherwise generating cosine similarity values between the language semantic output token and the combined semantic output token and between the vision semantic output token and the combined semantic output token. These cosine similarity values are combined to form the contrastive loss data.

At 514, the MFT model is adjusted using the contrastive loss data. In some examples, the MFT model is adjusted to reduce the contrastive loss data value toward zero, resulting in the MFT model being trained to focus on generating output that represents the semantic meaning of the combined modalities, rather than semantic meaning that is present in one of the modalities alone. This adjustment process is described in greater detail above with respect to at least FIG. 1.

Additionally, in some examples, the method 500 is used to train the MFT model further by applying a mask to a token of the language embeddings. Then, MLM loss data associated with the masked token is generated using the MFT model and the combined embeddings. The MLM loss data is then used to train the MFT model to better predict the content of a language token based on the content of the surrounding tokens as described herein.

Further, in some examples, the method 500 is used to train the MFT model further by applying a mask to feature map and object category embeddings associated with a RoI bounding box of the vision embeddings. Then, RoI classification loss data associated with the masked embeddings of the RoI bounding box is generated using the MFT model and the combined embeddings. The RoI classification loss data is then used to train the MFT model to better predict the feature map and/or object category content of a RoI bounding box based on the content of the surrounding RoI bounding boxes as described herein.

Furthermore, in some examples, the method 500 is used to train the MFT model further by using ITM indicators. An ITM indicator is received that is associated with the language modality data and the vision modality data, wherein the ITM indicator indicates whether the two sets of modality data match each other (e.g., the two sets of data are from the same source, rather than multiple sources that have been combined to create a non-matching pair). ITM loss data is generated using the MFT model, the combined embeddings, and the ITM indicator, which is compared to an indicator generated by the MFT model. The ITM loss data is then used to train the MFT model to better determine whether data from different modalities match or not.

It should be understood that, in some examples, the MFT model trained using method 500 is further trained and/or fine-tuned using content moderation loss data as described above with respect to system 300 of FIG. 3 and/or as described below with respect to method 600 of FIG. 6 without departing from the description.

FIG. 6 is a flowchart illustrating an example method 600 for using a trained multimodal fusion transformer (MFT) to perform content moderation. In some examples, the method 600 is executed or otherwise performed in a system such as system 100 of FIG. 1. Further, it should be understood that, in some examples, the operations of method 600 are substantially similar to or the same as the operations described above with respect to method 500 of FIG. 5, excepting 612.

At 602, language modality data and vision modality data of a multimodal media source are received. At 604, language embeddings are generated using the language modality data and, at 606, vision embeddings are generated using the vision modality data. At 608, the language embeddings and vision embeddings are combined into combined embeddings and, at 610, those combined embeddings are used with the MFT model to generate a language semantic output token, a vision semantic output token, and a combined semantic output token.

At 612, Content Moderation (CM) operations are performed in association with the multimodal media source using the semantic output tokens. In some examples, the CM operations include generating a CM indicator associated with the multimodal media source that is indicative of whether the multimodal media source is a candidate for moderation. In some such examples, the CM indicator is a binary value for which '1' indicates that the multimodal media source is a candidate for moderation and '0' indicates that the multimodal media source is not a candidate for moderation. Alternatively, or additionally, the CM indicator includes a percentage value or other similar value that indicates a likelihood that the multimodal media source is a candidate for moderation. Such a value can be compared to a defined threshold, value range, or the like to determine whether to moderate the multimodal media source.

Further, in some examples, CM operations include causing the multimodal media source to be blocked, to prevent the multimodal media source from being downloaded or loaded, or the like. Additionally, or alternatively, CM operations include sending notifications indicating that a multimodal media source is to be evaluated, moderated, or the like. In other examples, other types of CM operations are performed without departing from the description.

Exemplary Operating Environment

Figure 7:
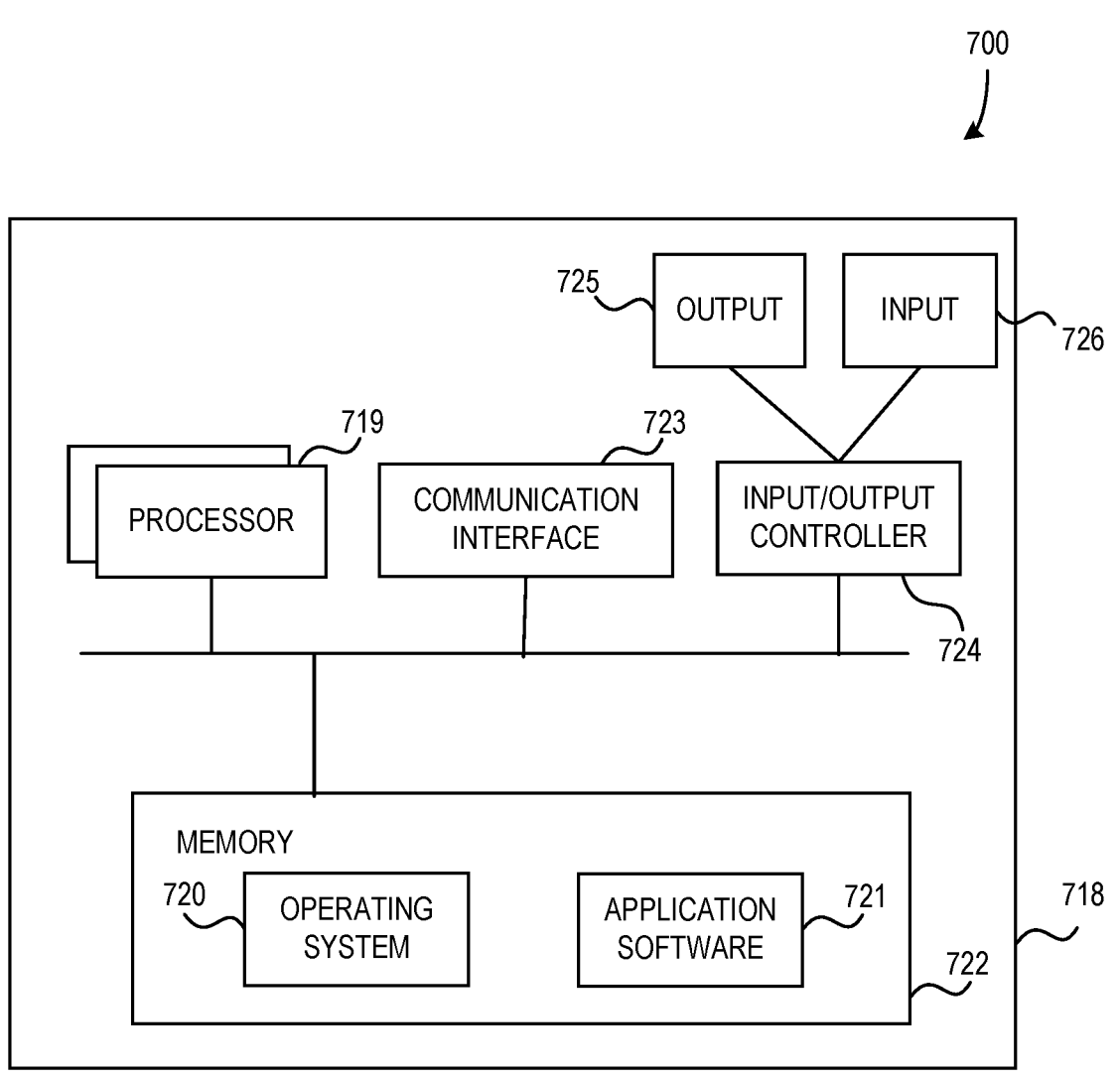
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, training and using a model for multimodal semantic output generation and associated content moderation as described herein is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to: receive first modality data associated with a first modality and second modality data associated with a second modality of a multimodal media source: generate first modality embeddings using the first modality data and a first embedding operation associated with the first modality: generate second modality embeddings using the second modality data and a second embedding operation associated with the second modality: combine the first modality embeddings and second modality embeddings into combined embeddings: generate a first modality semantic output token, a second modality semantic output token, and a combined semantic output token using a multimodal fusion transformer (MFT) model and the combined embeddings: generate contrastive loss data using the first modality semantic output token, the second modality semantic output token, and the combined semantic output token; and adjust the MFT model using the generated contrastive loss data.

An example computerized method comprises: receiving language modality data and vision modality data associated with a multimodal media source: generating language embeddings using the language modality data: generating vision embeddings using the vision modality data: combining the language embeddings and the vision embeddings into combined embeddings: generating a language semantic output token, a vision semantic output token, and a combined semantic output token using a multimodal fusion transformer (MFT) model, wherein the language semantic output token is based on the language embeddings, the vision semantic output token is based on the vision embeddings, and the combined semantic output token is based on the combined embeddings: generating contrastive loss data using the language semantic output token, the vision semantic output token, and the combined semantic output token; and adjusting the MFT model using the generated contrastive loss data.

One or more computer storage media having computer-executable instructions that, upon execution by a processor, cause the processor to at least: receive language modality data and vision modality data associated with a multimodal media source; generate language embeddings using the language modality data: generate vision embeddings using the vision modality data: combine the language embeddings and vision embeddings into combined embeddings: generate a language semantic output token, a vision semantic output token, and a combined semantic output token using a multimodal fusion transformer (MFT) model and the combined embeddings; and perform content moderation operations associated with the multimodal media source using at least one of the language semantic output token, the vision semantic output token, and the combined semantic output token.

Alternatively, or in addition to the other examples described herein, examples include any combination of the following:

wherein generating the contrastive loss data includes: calculating a first cosine similarity value between the first modality semantic output token and the combined semantic output token: calculating a second cosine similarity value between the second modality semantic output token and the combined semantic output token; and combining the first and second cosine similarity values to form the contrastive loss data.

wherein the memory and the computer program code are configured to further cause the processor to: generate a first modality classification token as an aggregate representation of tokens of the generated first modality embeddings: generate a second modality classification token as an aggregate representation of tokens of the generated second modality embeddings; and generate a combined classification token as an aggregate representation of the tokens of the generated first modality embeddings and the tokens of the generated second modality embeddings: wherein the combined embeddings include the generated first modality classification token, the generated second modality classification token, and the generated combined classification token.

wherein generating the first modality semantic output token includes: masking the second modality embeddings, the second modality classification token, and the combined classification token; and generating the first modality semantic output token using the first modality embeddings and the first modality classification token; wherein generating the second modality semantic output token includes: masking the first modality embeddings, the first modality classification token, and the combined classification token; and generating the second modality semantic output token using the second modality embeddings and the second modality classification token; and wherein generating the combined semantic output token includes: masking the first modality classification token and the second modality classification token; and generating the combined semantic output token using the combined embeddings and the combined classification token.

wherein the memory and the computer program code are configured to further cause the processor to: receive the first modality data associated with the first modality and the second modality data associated with the received second modality of a plurality of domain-specific multimodal media sources associated with a domain: generate domain-specific contrastive loss data using the received first modality data and second modality data of the plurality of domain-specific multimodal media sources; and adjust the MFT model using the generated domain-specific contrastive loss data, whereby the MFT model is fine-tuned to generate domain-specific semantic output tokens associated with the domain of the plurality of domain-specific multimodal media sources.

wherein the memory and the computer program code are configured to further cause the processor to: receive a Content Moderation (CM) indicator associated with the multimodal media source, wherein the CM indicator indicates whether the multimodal media source is a candidate for moderation based on content of the multimodal media source: generate CM loss data using the MFT model, the combined embeddings, and the CM indicator; and adjust the MFT model using the generated CM loss data, whereby the MFT model is fine-tuned to determine whether input multimodal media sources is a candidate for moderation for content.

wherein the memory and the computer program code are configured to further cause the processor to: receive third modality data associated with a third modality of the multimodal media source: generate third modality embeddings using the third modality data and a third embedding operation associated with the third modality, wherein the combined embeddings further include the third modality embeddings; and generate a third modality semantic output token using the MFT model and the combined embeddings, wherein generating the contrastive loss data further includes using the third modality semantic output token.

further comprising: applying a mask to a token of the language embeddings; generating masked language modeling (MLM) loss data associated with the masked token using the MFT model and the combined embeddings; and adjusting the MFT model using the generated MLM loss data.

further comprising: applying a mask to vision embeddings associated with a region of interest (RoI) bounding box of the vision embeddings, wherein the masked vision embeddings include at least one of the following: a feature map embedding associated with the RoI bounding box and an object category associated with the RoI bounding box: generating masked RoI classification loss data associated with the masked vision embeddings associated with the RoI bounding box using the MFT model and the combined embeddings; and adjusting the MFT model using the generated masked RoI classification loss data.

further comprising: receiving an Image-Text Matching (ITM) indicator associated with the received language modality data and the received vision modality data, wherein the ITM indicator indicates whether the received language modality data and received vision modality data match each other: generating ITM loss data using the MFT model, the combined embeddings, and the ITM indicator; and adjusting the MFT model using the generated ITM loss data.

further comprising: receiving a Content Moderation (CM) indicator associated with the multimodal media source, wherein the CM indicator indicates whether the multimodal media source is a candidate for moderation based on content of the multimodal media source: generating CM loss data using the MFT model, the combined embeddings, and the CM indicator; and adjusting the MFT model using the generated CM loss data, whereby the MFT model is fine-tuned to determine whether input multimodal media sources is a candidate for moderation for content.

wherein the computer-executable instructions, upon execution by a processor, further cause the processor to at least: receive a second set of language modality data associated with a unimodal media source: generate second language embeddings using the second set of language modality data: generate a second language semantic output token using the MFT model and the second language embeddings; and perform content moderation operations associated with the unimodal media source using the second language semantic output token.

wherein the computer-executable instructions, upon execution by a processor, further cause the processor to at least: receive a second set of vision modality data associated with a unimodal media source: generate second vision embeddings using the second set of vision modality data: generate a second vision semantic output token using the MFT model and the second vision embeddings; and perform content moderation operations associated with the unimodal media source using the second vision semantic output token.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving language modality data and vision modality data associated with a multimodal media source: exemplary means for generating language embeddings using the language modality data: exemplary means for generating vision embeddings using the vision modality data: exemplary means for combining the language embeddings and vision embeddings into combined embeddings: exemplary means for generating a language semantic output token, a vision semantic output token, and a combined semantic output token using a multimodal fusion transformer (MFT) model, wherein the language semantic output token is based on the language embeddings, the vision semantic output token is based on the vision embeddings, and the combined semantic output token is based on the combined embeddings; exemplary means for generating contrastive loss data using the language semantic output token, the vision semantic output token, and the combined semantic output token; and exemplary means for adjusting the MFT model using the generated contrastive loss data.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising." "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising programming instructions for execution by the processor, wherein the programming instructions, upon execution by the processor, cause the system to perform the following operations:
receiving multimodal social media content associated with a social media platform, the multimodal social media content combining language modality data with vision modality data, each of the language modality data and the vision modality data being innocuous alone, wherein a combined meaning of the language modality data and the vision modality data is harmful within a multimodal context;
generating language embeddings from the language modality data using a first embedding operation;
generating vision embeddings from the vision modality data using a second embedding operation;
combining the language embeddings and the vision embeddings into combined embeddings; and
training a multimodal fusion transformer (MFT) model to perform multimodal content moderation, within the multimodal context, for the social media platform using training data that includes the combined embeddings, wherein training the MFT model includes using the MFT model to generate one or more language semantic output tokens, one or more vision semantic output tokens, and one or more combined semantic output tokens from the combined embeddings, determining contrastive loss data based on the one or more language semantic output tokens, the one or more vision semantic output tokens, and the one or more combined semantic output tokens, and adjusting the MFT model based on the contrastive loss data.

2. The system of claim 1, wherein determining the contrastive loss data includes:
calculating a first cosine similarity value between the one or more language semantic output tokens and the one or more combined semantic output tokens;
calculating a second cosine similarity value between the one or more vision semantic output tokens and the one or more combined semantic output tokens; and
combining the first cosine similarity value with the second cosine similarity value to form the contrastive loss data.

3. A method comprising:
receiving multimodal social media content associated with a social media platform, the multimodal social media content combining language modality data with vision modality data, each of the language modality data and the vision modality data being innocuous alone, wherein a combined meaning of the language modality data and the vision modality data is harmful within a multimodal context;
generating language embeddings from the language modality data using a first embedding operation;
generating vision embeddings from the vision modality data using a second embedding operation;
combining the language embeddings and the vision embeddings into combined embeddings; and
training a multimodal fusion transformer (MFT) model to perform multimodal content moderation, within the multimodal context, for the social media platform using training data that includes the combined embeddings, wherein training the MFT model includes using the MFT model to generate one or more language semantic output tokens, one or more vision semantic output tokens, and one or more combined semantic output tokens from the combined embeddings, determining contrastive loss data based on the one or more language semantic output tokens, the one or more vision semantic output tokens, and the one or more combined semantic output tokens, and adjusting the MFT model based on the contrastive loss data.

4. The method of claim 3, wherein generating the contrastive loss data includes:

calculating a first cosine similarity value between the one or more language semantic output tokens and the one or more combined semantic output tokens;

calculating a second cosine similarity value between the one or more vision semantic output tokens and the one or more combined semantic output tokens; and combining the first cosine similarity value with the second cosine similarity value to form the contrastive loss data.

5. A non-transitory computer storage medium having programming instructions stored thereon that, upon execution by a processor of a system, cause the system to perform the following operations:

receiving multimodal social media content associated with a social media platform, the multimodal social media content combining language modality data with vision modality data, each of the language modality data and the vision modality data being innocuous alone, wherein a combined meaning of the language modality data and the vision modality data is harmful within a multimodal context;

generating language embeddings from the language modality data using a first embedding operation;

generating vision embeddings from the vision modality data using a second embedding operation;

combining the language embeddings and the vision embeddings into combined embeddings; and training a multimodal fusion transformer (MFT) model to perform multimodal content moderation, within the multimodal context, for the social media platform using training data that includes the combined embeddings, wherein training the MFT model includes using the MFT model to generate one or more language semantic output tokens, one or more vision semantic output tokens, and one or more combined semantic output tokens from the combined embeddings, determining contrastive loss data based on the one or more language semantic output tokens, the one or more vision semantic output tokens, and the one or more combined semantic output tokens, and adjusting the MFT model based on the contrastive loss data.

6. The system of claim 1, wherein the combined embeddings include one or more language classification tokens (CLS) tokens generated as an aggregate representation of the one or more language semantic output tokens, one or more vision CLS tokens generated as an aggregate representation of the one or more vision semantic output tokens, and one or more combined CLS tokens generated as an aggregate representation of the one or more language semantic output tokens and the one or more vision CLS tokens.

7. The system of claim 1, wherein the contrastive loss data includes domain-specific contrastive loss data associated with a content moderation domain, and wherein the domain-specific contrastive loss data is used to train the MFT model is trained to generate domain- specific semantic output tokens associated with the content moderation domain.

8. The system of claim 1, wherein the contrastive loss data includes Masked Language Modeling (MLM) loss data.

9. The system of claim 8, wherein the MLM loss data is used to train the MFT model to determine masked or missing text tokens based on surrounding text tokens in the training data.

10. The system of claim 8, wherein the MLM loss data is generated by masking a text token of the language embeddings.

11. The system of claim 1, wherein the contrastive loss data includes Masked region of interest (RoI) loss data.

12. The system of claim 11, wherein the Masked RoI loss data is used to train the MFT model to predict visual information in a bounding box based on the one or more language semantic output tokens.

13. The system of claim 11, wherein the Masked RoI loss data is generated by masking a region of interest (RoI) bounding box of the vision embeddings to produce masked vision embeddings.

14. The system of claim 13, wherein the masked vision embeddings include a feature map embedding associated with the RoI bounding box and an object category associated with the RoI bounding box.

15. The system of claim 1, wherein the contrastive loss data includes Image-Text Matching (ITM) loss data.

16. The system of claim 15, wherein the ITM loss data is used to train the MFT model to determine whether text and image data from the training data match semantically.

17. The system of claim 15, wherein the ITM loss data is computed by the MFT model upon determining that the language modality data and the vision modality data originate from a common source.

* * * * *